United States Patent
Roth et al.

(10) Patent No.: US 9,906,564 B2
(45) Date of Patent: *Feb. 27, 2018

(54) ACCESS CONTROL USING IMPERSONIZATION

(71) Applicant: Amazon Technologies, Inc., Seattle, WA (US)

(72) Inventors: Gregory Branchek Roth, Seattle, WA (US); Matthew James Wren, Seattle, WA (US); Brian Irl Pratt, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/638,227

(22) Filed: Jun. 29, 2017

(65) Prior Publication Data

US 2017/0324782 A1 Nov. 9, 2017

Related U.S. Application Data

(63) Continuation of application No. 15/237,505, filed on Aug. 15, 2016, now Pat. No. 9,699,219, which is a
(Continued)

(51) Int. Cl.
*H04L 29/06* (2006.01)
*G06F 21/60* (2013.01)
*H04L 9/32* (2006.01)

(52) U.S. Cl.
CPC .......... *H04L 63/205* (2013.01); *G06F 21/602* (2013.01); *H04L 9/3247* (2013.01);
(Continued)

(58) Field of Classification Search
CPC ........ G06F 21/41; H04L 63/205; H04L 63/20
See application file for complete search history.

(56) References Cited

U.S. PATENT DOCUMENTS

| 5,179,591 A | 1/1993 | Hardy et al. |
| 5,200,999 A | 4/1993 | Matyas et al. |

(Continued)

FOREIGN PATENT DOCUMENTS

| WO | 2006077822 A1 | 7/2006 |
| WO | 2008024705 A2 | 2/2008 |
| WO | 2014063361 A1 | 5/2014 |

OTHER PUBLICATIONS

"Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

(Continued)

*Primary Examiner* — Ali Shayanfar
(74) *Attorney, Agent, or Firm* — Davis Wright Tremaine LLP

(57) ABSTRACT

A first service submits a request to a second service on behalf of a customer of a service provider. The request may have been triggered by a request of the customer to the first service. To process the request, the second service evaluates one or more policies to determine whether fulfillment of the request is allowed by policy associated with the customer. The one or more policies may state one or more conditions on one or more services that played a role in submission of the request. If determined that the policy allows fulfillment of the request, the second service fulfills the request.

20 Claims, 16 Drawing Sheets

Related U.S. Application Data continuation of application No. 14/096,783, filed on Dec. 4, 2013, now Pat. No. 9,420,007.

(52) U.S. Cl.
CPC .............. *H04L 63/20* (2013.01); *G06F 21/60* (2013.01); *H04L 63/18* (2013.01)

(56) References Cited

U.S. PATENT DOCUMENTS

| | | |
|---|---|---|
| 5,497,421 A | 3/1996 | Kaufman et al. |
| 6,084,969 A | 7/2000 | Wright et al. |
| 6,097,817 A | 8/2000 | Bilgic et al. |
| 6,185,316 B1 | 2/2001 | Buffam |
| 6,453,416 B1 | 9/2002 | Epstein |
| 6,826,686 B1 | 11/2004 | Peyravian et al. |
| 6,851,054 B2 | 2/2005 | Wheeler et al. |
| 6,957,393 B2 | 10/2005 | Fano et al. |
| 6,959,394 B1 | 10/2005 | Brickell et al. |
| 6,985,583 B1 | 1/2006 | Brainard et al. |
| 7,010,689 B1 | 3/2006 | Matyas, Jr. et al. |
| 7,073,195 B2 | 7/2006 | Brickell et al. |
| 7,139,917 B2 | 11/2006 | Jablon |
| 7,228,417 B2 | 6/2007 | Roskind |
| 7,320,076 B2 | 1/2008 | Caronni |
| 7,512,965 B1 | 3/2009 | Amdur et al. |
| 7,685,430 B1 | 3/2010 | Masurkar |
| 7,721,322 B2 | 5/2010 | Sastry et al. |
| 7,757,271 B2 | 7/2010 | Amdur et al. |
| 7,765,584 B2 | 7/2010 | Roskind |
| 7,836,306 B2 | 11/2010 | Pyle et al. |
| 7,890,767 B2 | 2/2011 | Smith et al. |
| 7,913,084 B2 | 3/2011 | Medvinsky et al. |
| 7,917,764 B2 | 3/2011 | Futa et al. |
| 8,006,289 B2 | 8/2011 | Hinton et al. |
| 8,024,562 B2 | 9/2011 | Gentry et al. |
| 8,041,954 B2 | 10/2011 | Plesman |
| 8,059,820 B2 | 11/2011 | Malaviarachchi et al. |
| 8,151,116 B2 | 4/2012 | van der Horst et al. |
| 8,275,356 B2 | 9/2012 | Hickie |
| 8,332,922 B2 | 12/2012 | Dickinson et al. |
| 8,370,638 B2 | 2/2013 | Duane et al. |
| 8,386,800 B2 | 2/2013 | Kocher et al. |
| 8,387,117 B2 | 2/2013 | Eom et al. |
| 8,418,222 B2 | 4/2013 | Gbadegesin et al. |
| 8,423,759 B2 | 4/2013 | Moreau |
| 8,453,198 B2 | 5/2013 | Band et al. |
| 8,464,058 B1 | 6/2013 | Chen et al. |
| 8,464,354 B2 | 6/2013 | Teow et al. |
| 8,498,414 B2 | 7/2013 | Rossi |
| 8,533,772 B2 | 9/2013 | Garg et al. |
| 8,543,916 B2 | 9/2013 | Anderson et al. |
| 8,561,152 B2 | 10/2013 | Novak et al. |
| 8,621,561 B2 | 12/2013 | Cross et al. |
| 8,688,813 B2 | 4/2014 | Maes |
| 8,695,075 B2 | 4/2014 | Anderson et al. |
| 8,739,308 B1 | 5/2014 | Roth et al. |
| 8,745,205 B2 | 6/2014 | Anderson et al. |
| 8,776,190 B1 | 7/2014 | Cavage et al. |
| 8,776,204 B2 | 7/2014 | Faynberg et al. |
| 8,868,923 B1 | 10/2014 | Hamlet et al. |
| 8,892,865 B1 | 11/2014 | Roth et al. |
| 8,953,798 B2 | 2/2015 | Rossi |
| 8,959,331 B2 * | 2/2015 | Chastain .............. H04L 63/0428 713/150 |
| 9,059,982 B2 * | 6/2015 | Nishizawa ............. G06F 21/604 |
| 9,367,697 B1 * | 6/2016 | Roth ...................... G06F 21/602 |
| 2001/0008013 A1 | 7/2001 | Johnson et al. |
| 2001/0018739 A1 | 8/2001 | Anderson et al. |
| 2002/0016840 A1 | 2/2002 | Herzog et al. |
| 2002/0067832 A1 | 6/2002 | Jablon |
| 2002/0112181 A1 | 8/2002 | Smith |
| 2002/0161723 A1 | 10/2002 | Asokan et al. |
| 2002/0161998 A1 | 10/2002 | Cromer et al. |
| 2002/0162019 A1 | 10/2002 | Berry et al. |
| 2002/0194483 A1 | 12/2002 | Wenocur et al. |
| 2002/0198848 A1 | 12/2002 | Michener |
| 2003/0016826 A1 | 1/2003 | Asano et al. |
| 2003/0041110 A1 | 2/2003 | Wenocur et al. |
| 2003/0099361 A1 | 5/2003 | Uchida |
| 2003/0135740 A1 | 7/2003 | Talmor et al. |
| 2003/0145197 A1 | 7/2003 | Lee et al. |
| 2003/0149781 A1 | 8/2003 | Yared et al. |
| 2003/0188117 A1 | 10/2003 | Yoshino et al. |
| 2004/0088260 A1 | 5/2004 | Foster et al. |
| 2004/0103096 A1 | 5/2004 | Larsen |
| 2004/0128505 A1 | 7/2004 | Larsen |
| 2004/0128510 A1 | 7/2004 | Larsen |
| 2004/0131185 A1 | 7/2004 | Kakumer |
| 2004/0143733 A1 | 7/2004 | Ophir et al. |
| 2004/0158734 A1 | 8/2004 | Larsen |
| 2004/0172535 A1 | 9/2004 | Jakobsson et al. |
| 2005/0036611 A1 | 2/2005 | Seaton et al. |
| 2005/0043999 A1 | 2/2005 | Ji et al. |
| 2005/0060580 A1 | 3/2005 | Chebolu et al. |
| 2005/0080914 A1 | 4/2005 | Lerner et al. |
| 2005/0132192 A1 | 6/2005 | Jeffries et al. |
| 2005/0132215 A1 | 6/2005 | Wang et al. |
| 2005/0166263 A1 | 7/2005 | Nanopoulos et al. |
| 2005/0235148 A1 | 10/2005 | Scheidt et al. |
| 2005/0273862 A1 | 12/2005 | Benaloh et al. |
| 2005/0278547 A1 | 12/2005 | Hyndman et al. |
| 2006/0070116 A1 | 3/2006 | Park |
| 2006/0075462 A1 | 4/2006 | Golan et al. |
| 2006/0094406 A1 | 5/2006 | Cortegiano |
| 2006/0094410 A1 | 5/2006 | Cortegiano |
| 2006/0100928 A1 | 5/2006 | Walczak et al. |
| 2006/0130100 A1 | 6/2006 | Pentland |
| 2006/0149677 A1 | 7/2006 | Shahine et al. |
| 2006/0174125 A1 | 8/2006 | Brookner |
| 2006/0190331 A1 | 8/2006 | Tollinger et al. |
| 2006/0206440 A1 | 9/2006 | Anderson et al. |
| 2006/0206925 A1 | 9/2006 | Dillaway et al. |
| 2006/0218625 A1 | 9/2006 | Pearson et al. |
| 2006/0230284 A1 | 10/2006 | Fiske |
| 2006/0256961 A1 | 11/2006 | Brainard et al. |
| 2006/0271785 A1 | 11/2006 | Holtmanns et al. |
| 2006/0282878 A1 | 12/2006 | Stanley et al. |
| 2007/0005955 A1 | 1/2007 | Pyle et al. |
| 2007/0033396 A1 | 2/2007 | Zhang et al. |
| 2007/0037552 A1 | 2/2007 | Lee et al. |
| 2007/0061571 A1 | 3/2007 | Hammes et al. |
| 2007/0061885 A1 | 3/2007 | Hammes et al. |
| 2007/0136361 A1 | 6/2007 | Lee et al. |
| 2007/0157309 A1 | 7/2007 | Bin et al. |
| 2007/0174614 A1 | 7/2007 | Duane et al. |
| 2007/0186102 A1 | 8/2007 | Ng |
| 2007/0234410 A1 | 10/2007 | Geller |
| 2007/0250706 A1 | 10/2007 | Oba |
| 2007/0277231 A1 | 11/2007 | Medvinsky et al. |
| 2008/0010665 A1 | 1/2008 | Hinton et al. |
| 2008/0040773 A1 | 2/2008 | AlBadarin et al. |
| 2008/0066150 A1 | 3/2008 | Lim |
| 2008/0072311 A1 | 3/2008 | Mullick et al. |
| 2008/0080718 A1 | 4/2008 | Meijer et al. |
| 2008/0083036 A1 | 4/2008 | Ozzie et al. |
| 2008/0141339 A1 * | 6/2008 | Gomez .................... H04L 63/08 726/1 |
| 2008/0163337 A1 | 7/2008 | Tuliani et al. |
| 2008/0168530 A1 | 7/2008 | Kuehr-McLaren et al. |
| 2008/0170693 A1 * | 7/2008 | Spies .................. G06F 21/6209 380/277 |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0157452 A1 * | 6/2009 | Arora ................. G06Q 30/0201 705/7.29 |
| 2009/0172793 A1 | 7/2009 | Newstadt et al. |
| 2009/0210712 A1 | 8/2009 | Fort |

(56) References Cited

U.S. PATENT DOCUMENTS

| | | | |
|---|---|---|---|
| 2009/0215411 A1* | 8/2009 | Tucker | H04W 4/10 455/90.2 |
| 2009/0217385 A1 | 8/2009 | Teow et al. | |
| 2009/0254572 A1 | 10/2009 | Redlich et al. | |
| 2009/0320093 A1 | 12/2009 | Glazier et al. | |
| 2010/0017603 A1 | 1/2010 | Jones | |
| 2010/0037304 A1 | 2/2010 | Canning et al. | |
| 2010/0058060 A1 | 3/2010 | Schneider | |
| 2010/0058072 A1 | 3/2010 | Teow et al. | |
| 2010/0071056 A1 | 3/2010 | Cheng et al. | |
| 2010/0083001 A1 | 4/2010 | Shah et al. | |
| 2010/0111296 A1 | 5/2010 | Brown et al. | |
| 2010/0125894 A1 | 5/2010 | Yasrebi et al. | |
| 2010/0131756 A1 | 5/2010 | Schneider | |
| 2010/0142704 A1 | 6/2010 | Camenisch et al. | |
| 2010/0185749 A1 | 7/2010 | Sawai | |
| 2010/0205649 A1 | 8/2010 | Becker et al. | |
| 2010/0239095 A1 | 9/2010 | Carter et al. | |
| 2010/0251347 A1 | 9/2010 | Roskind | |
| 2010/0269156 A1 | 10/2010 | Hohlfeld et al. | |
| 2010/0290476 A1 | 11/2010 | Brindle et al. | |
| 2010/0332845 A1 | 12/2010 | Asaka | |
| 2011/0004753 A1 | 1/2011 | Gomi et al. | |
| 2011/0010538 A1 | 1/2011 | Falk et al. | |
| 2011/0035593 A1 | 2/2011 | Pyle et al. | |
| 2011/0055562 A1 | 3/2011 | Adelman et al. | |
| 2011/0055585 A1 | 3/2011 | Lee | |
| 2011/0078107 A1 | 3/2011 | Almeida et al. | |
| 2011/0083015 A1 | 4/2011 | Meier | |
| 2011/0099362 A1 | 4/2011 | Haga et al. | |
| 2011/0131415 A1 | 6/2011 | Schneider | |
| 2011/0138192 A1 | 6/2011 | Kocher et al. | |
| 2011/0167479 A1 | 7/2011 | Maes | |
| 2011/0179469 A1 | 7/2011 | Blinn et al. | |
| 2011/0231940 A1 | 9/2011 | Perumal et al. | |
| 2011/0239283 A1 | 9/2011 | Chern | |
| 2011/0252229 A1 | 10/2011 | Belenkiy et al. | |
| 2011/0265172 A1 | 10/2011 | Sharma et al. | |
| 2011/0296497 A1 | 12/2011 | Becker | |
| 2011/0311055 A1 | 12/2011 | Parann-Nissany | |
| 2011/0320606 A1 | 12/2011 | Madduri et al. | |
| 2012/0017095 A1 | 1/2012 | Blenkhorn et al. | |
| 2012/0020474 A1 | 1/2012 | Kudoh et al. | |
| 2012/0023334 A1 | 1/2012 | Brickell et al. | |
| 2012/0036370 A1 | 2/2012 | Lim et al. | |
| 2012/0036551 A1 | 2/2012 | Le Saint et al. | |
| 2012/0054625 A1 | 3/2012 | Pugh et al. | |
| 2012/0060035 A1 | 3/2012 | Kalmady et al. | |
| 2012/0106735 A1 | 5/2012 | Fukuda | |
| 2012/0110636 A1 | 5/2012 | Van Biljon et al. | |
| 2012/0144034 A1 | 6/2012 | McCarty | |
| 2012/0159577 A1 | 6/2012 | Belinkiy et al. | |
| 2012/0216267 A1 | 8/2012 | Austel et al. | |
| 2012/0233216 A1 | 9/2012 | Lim | |
| 2012/0243687 A1 | 9/2012 | Li et al. | |
| 2012/0245978 A1 | 9/2012 | Jain et al. | |
| 2012/0265690 A1 | 10/2012 | Bishop et al. | |
| 2012/0311663 A1 | 12/2012 | Seidl et al. | |
| 2012/0317414 A1 | 12/2012 | Glover | |
| 2013/0012165 A1 | 1/2013 | Popovich et al. | |
| 2013/0031255 A1 | 1/2013 | Maloy et al. | |
| 2013/0086662 A1 | 4/2013 | Roth et al. | |
| 2013/0086663 A1 | 4/2013 | Roth et al. | |
| 2013/0095794 A1* | 4/2013 | Lhamon | H04W 12/06 455/411 |
| 2013/0107324 A1* | 5/2013 | Kamath | G06F 3/1222 358/1.15 |
| 2013/0111217 A1 | 5/2013 | Kopasz et al. | |
| 2013/0132232 A1 | 5/2013 | Pestoni et al. | |
| 2013/0145447 A1 | 6/2013 | Maron | |
| 2013/0166703 A1* | 6/2013 | Hammer | H04L 41/50 709/220 |
| 2013/0166918 A1 | 6/2013 | Shahbazi et al. | |
| 2013/0191884 A1 | 7/2013 | Leicher et al. | |
| 2013/0198519 A1 | 8/2013 | Marien | |
| 2013/0219461 A1 | 8/2013 | Esaki et al. | |
| 2013/0254536 A1 | 9/2013 | Glover | |
| 2013/0268676 A1 | 10/2013 | Martins et al. | |
| 2013/0282461 A1 | 10/2013 | Ovick et al. | |
| 2013/0318630 A1 | 11/2013 | Lam | |
| 2014/0013409 A1 | 1/2014 | Halageri | |
| 2014/0074515 A1* | 3/2014 | Sylvester | G06Q 30/0635 705/4 |
| 2014/0082715 A1 | 3/2014 | Grajek et al. | |
| 2014/0122866 A1 | 5/2014 | Haeger et al. | |
| 2014/0123207 A1 | 5/2014 | Agarwal et al. | |
| 2014/0123229 A1* | 5/2014 | Franklin | G06F 21/335 726/4 |
| 2014/0181925 A1 | 6/2014 | Smith et al. | |
| 2014/0208408 A1 | 7/2014 | Bilgen et al. | |
| 2014/0229732 A1 | 8/2014 | Roth et al. | |
| 2014/0281477 A1 | 9/2014 | Nayshtut et al. | |
| 2014/0281487 A1 | 9/2014 | Klausen et al. | |
| 2014/0330974 A1 | 11/2014 | Labocki | |
| 2015/0082039 A1 | 3/2015 | Stalzer et al. | |
| 2015/0089614 A1 | 3/2015 | Mathew et al. | |
| 2015/0156174 A1* | 6/2015 | Fahey | H04L 63/0428 713/168 |

OTHER PUBLICATIONS

"Notification of Transmittal of the International Search Report and the Written Opinion of the International Searching Authority, or the Declaration dated Dec. 27, 2012," International Patent Application No. PCT/US2012/058083, filed Sep. 28, 2012.

"Physical unclonable function," Wikipedia the Free Encyclopedia, retrieved Aug. 22, 2013, from http://en.wikipedia.org/wiki/Physical_unclonable_function, 8 pages.

Berners-Lee et al., "Uniform Resource Identifier (URI): Generic Syntax," Network Working Group Request for Comments: 3986, The Internet Society 2005 retrieved on Nov. 30, 2011, from http://www.ieff.org/rfc/rfc3986.txt.

Ghorbel-Talbi et al., "Managing Delegation in Access Control Models," International Conference on Advanced Computing and Communications, pp. 744-751, Dec. 18-21, 2007.

International Search Report and Written Opinion dated Dec. 30, 2014 in International Patent Application No. PCT/US2014/057043, filed Sep. 23, 2014.

International Search Report and Written Opinion dated Dec. 30, 2014 in International Patent Application No. PCT/US2014/057051, filed Sep. 23, 2014.

International Search Report and Written Opinion dated Oct. 22, 2014, International Patent Application No. PCT/US2014/042569, filed Jun. 16, 2014.

Krawczyk et al., "HMAC: Keyed-Hashing for Message Authentication," Internet Engineering Task Force (IETF) Request for Comments: 2104, Feb. 1997, retrieved Jan. 22, 2015, from https://tols.ieff.org/html/rfc2104, pp. 1-11.

Liscano et al., "A Context-based Delegation Access Control Model for Pervasive Computing," 21st International Conference on Advanced Information Networking and Applications Workshops 2:44-51, May 21-23, 2007.

Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.

Massachusetts Institute of Technology, "Kerberos V5 System Administrator's Guide [online]," May 2012 retrieved Jun. 27, 2012, from http://web.mit.edu/kerberos/krb5-1.10/krb5-1.10.2/doc/krb5-admin.html, 57 pages.

Massachusetts Institute of Technology, "Kerberos V5 UNIX User's Guide," dated May 2012, retrieved on Jun. 28, 2012, from http://web.mit.edu/kerberos/krb5-1.10/krb5-1.10.2/doc/krb5-user.html, 38 pages.

Roth et al., "Multiple Authority Key Derivation," U.S. Appl. No. 13/431,760, filed Mar. 27, 2012.

Roth et al., "Source Identification for Unauthorized Copies of Content," U.S. Appl. No. 13/431,898, filed Mar. 27, 2012.

(56) References Cited

OTHER PUBLICATIONS

Roth et al.,"Hierarchical Data Access Techniques," U.S. Appl. No. 13/431,882, filed Mar. 27, 2012.
Simpson, "PPP Challenge Handshake Authentication Protocol (CHAP)," Network Working Group, Aug. 1996, retrieved from internet Jun. 27, 2012, https://tools.ieff.org/html/rfc1994, 13 pages.
TCG Published, "TPM Main Part 3 Commands," Specification Version 1.2, Level 2 Revision 116, Mar. 1, 2011, 339 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Revision 116, Mar. 1, 2011, 201 pages.
Wang et al., "Extending the Security Assertion Markup Language to Support Delegation for Web Services and Grid Services," IEEE International Conference on Web Services 1:67-74, Jul. 11-15, 2005.

\* cited by examiner

ACCESS CONTROL USING IMPERSONIZATION

CROSS REFERENCE TO RELATED APPLICATIONS

This application is a continuation of U.S. patent application Ser. No. 15/237,505, filed Aug. 15, 2016, entitled "ACCESS CONTROL USING IMPERSONIZATION," which is a the continuation of U.S. patent application Ser. No. 14/096,783, filed Dec. 4, 2013, now U.S. Pat. No. 9,420,007, entitled "ACCESS CONTROL USING IMPERSONIZATION," the disclosures of which are incorporated by reference herein in their entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
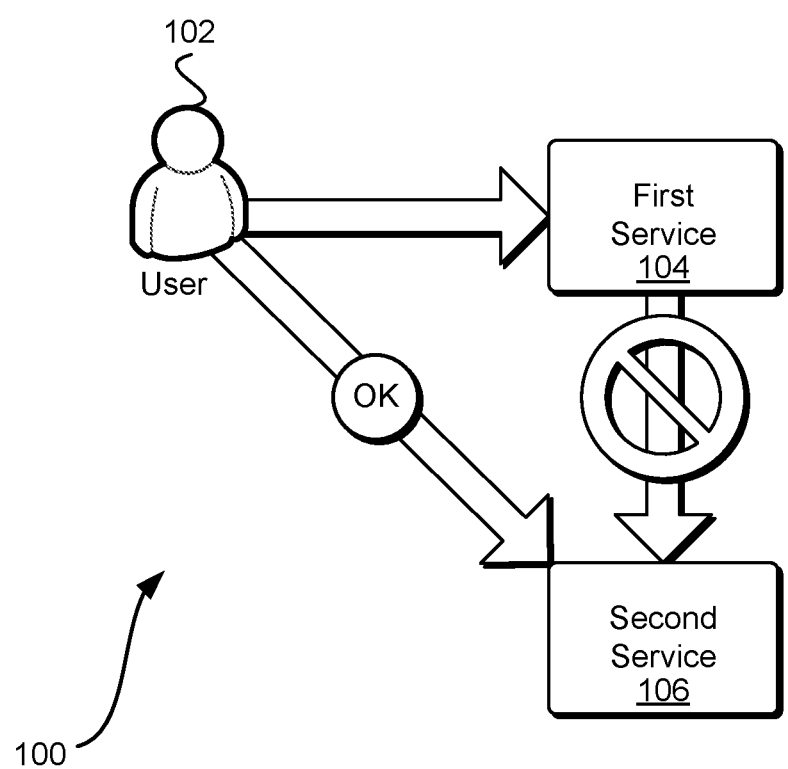
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to policy control for systems in which one system is able to submit, on behalf of an entity, requests to another system. In an embodiment, a service provider comprises a plurality of services, each service corresponding to a system that performs operations as part of a service offering. The services may be collectively configured so one or more services are able to successfully have requests fulfilled by other services on behalf of customers despite the customers not having themselves originated the requests. In this manner, services interact with one another to provide a robust offering of services.

In various embodiments, customers of the service provider can programmatically interact (e.g., through application programming interface (API) calls over a network) with the services for utilization thereof. In some instances, a request from a customer may trigger one or more other requests from one service to another. A customer may, for instance submit a first request to a first service and fulfillment of the request may include submission, by the first service, of one or more second requests to one or more second services. One or more of the one or more second services may themselves each submit a request to one or more third services as a result of having received a corresponding second request. Generally, a single customer request may trigger various requests among a set of services of the service provider.

Various techniques described and suggested herein allow customers of a service provider control over conditions that must be met before a request from one service to another service is fulfillable. In some examples, customers are provided an API through which the customers can programmatically configure policies applicable to computing resources of the customers. A policy of a customer may state one or more conditions required to be satisfied for a request from one service to another on behalf of the customer to be fulfilled and/or one or more conditions required to be satisfied for a request from one service to another on behalf of the customer to be denied. In this manner, customers can control which services are able to successfully have requests fulfilled by other services, when such requests are fulfillable and, generally, when services are able to act on behalf of the customers.

In some embodiments, a first request from a customer to a first service provider is evaluated using an authentication service, which may be a service of the service provider. The authentication service may evaluate an electronic signature of the first request and provide information indicative of whether the electronic signature is valid. The authentication service may also provide other information that enables the submission of requests from the first service to one or more other services such that the requests will be fulfilled. For example, the authentication service may provide information enabling the first service to digitally sign requests to one or more other services. The information may also enable another service to distinguish a request from the first service from a request from another service or from the customer. In addition, the information may enable another service to determine a set of services associated with a received request, where the association is due to having submitted an earlier request that caused submission of the received request. For example, if a customer submits a request to a first service and, as a result, the first service submits a second request to a second service and, as a result, the second service submits a third request to a third service, the third service is able to determine that the third request is associated with the customer, the first service, and the second service as a result of the first, second, and third requests. In this manner, the third service is able to evaluate policy (itself or by communication with a policy evaluation service) that may apply to such requests.

FIG. 1 shows an illustrative example of an environment in which various embodiments can be practiced. In the environment 100 of FIG. 1, a user 102 communicates with various services which may be services of a service provider and, as discussed in more detail below, services of a computing resource service provider. As illustrated in FIG. 1, the user 102 communicates with a first service 104 and a second service 106. Each of the services 104 and 106 may be computer systems configured to perform operations in accordance with a service offering of a provider. It should be noted that the term "service" is used both to refer to computer systems that are configured to provide an offering of a service provider as well as the offering itself, and the meaning of the term "service" should be clear from context. Further, while the figures show users as human operators, it should be noted that users may be automated operators, such as processes executing on a computing device.

Communication by the user 102 with a service may occur through an appropriate computing device. For example, the user 102 may submit requests to the first service 104 and/or second service 106 utilizing an appropriate computing device such as a personal or laptop computer, mobile device, tablet computing device, electronic book reader and generally any device configured to submit electronic requests over a network. Further, as noted, one or both of the first service 104 and second service 106 may be services of a computing resource service provider. Customers of the computing resource service provider may utilize computing resource services to provide their own services and/or to configure computer systems that perform various operations in support of their activities. As an illustrative example, the first service 104 may be a virtual computer system service that hosts virtual computer systems that are programmatically managed by customers. The second service 106 may be a data storage service that hosts data storage devices and stores data on behalf of customers of the computing resource service provider. Other types of services, including some enumerated below, are considered as being within the scope of the present disclosure.

The user 102 may be a customer of the computing resource service provider and communications from the user 102 to the first service 104 and second service 106 may be pursuant to utilization of the services of the computing resource service provider. Requests from user 102 may be made, for example, to configure one or more computing resources hosted by the first service 104 and for second service 106. Requests from user 102 may also be submitted for other reasons such as for accessing data provided by the first service 104 and/or second service 106 and, generally, for other purposes. In other examples, the user 102 is a customer of a customer of the computing resource service provider. A first customer of the computing resource service provider may for instance utilize services of the computing resource service provider to provide a website and/or a backend system for a mobile application. Requests may originate from the user 102 (a second customer, being a customer of the first customer) for the purposes of accessing the website and/or backend system. Generally requests may be submitted for various purposes which vary among various embodiments.

As illustrated in FIG. 1, the user 102 submits requests to the first service 104 and to the second service 106. A request from the user 102 to the first service 104 may cause, as part of fulfillment of the request, the first service 104 to submit one or more requests to one or more other services, such as, as illustrated in FIG. 1, a request to the second service 106. The first service may, for instance, submit the request to the second service synchronously with processing of the user's request. The scope of the present disclosure, however, also extends to embodiments where the first service 104 submits a request on behalf of the user 102 asynchronously with any request from the user 102.

In an embodiment, as illustrated in the figure, the second service 106 operates differently depending on the originator of a request. In this particular example, as illustrated in FIG. 1, the second service 106 fulfills requests submitted directly from the user 102 and denies requests from the first service 104. In other words, the second service 106 is configured to distinguish between requests submitted by a user 102 and requests submitted by another entity on behalf of the user 102. The first service 104 may for instance and as discussed in more detail below, be prohibited by policy from submitting requests to the second service 106 on behalf of the user 102. Thus, while the first service 104 may be operating on behalf of the user 102, the request is denied. It should be noted that the particular denial illustrated in FIG. 1 is illustrative and numerous variations are considered as being within the scope of the present disclosure. As noted for instance, some requests from the first service to the second service may be allowed when submitted on behalf of the user 102. Further, as discussed in more detail below, the fulfillment of a request may involve numerous services of a computing resource service provider and a request received by a service may have passed through multiple services.

Figure 2:
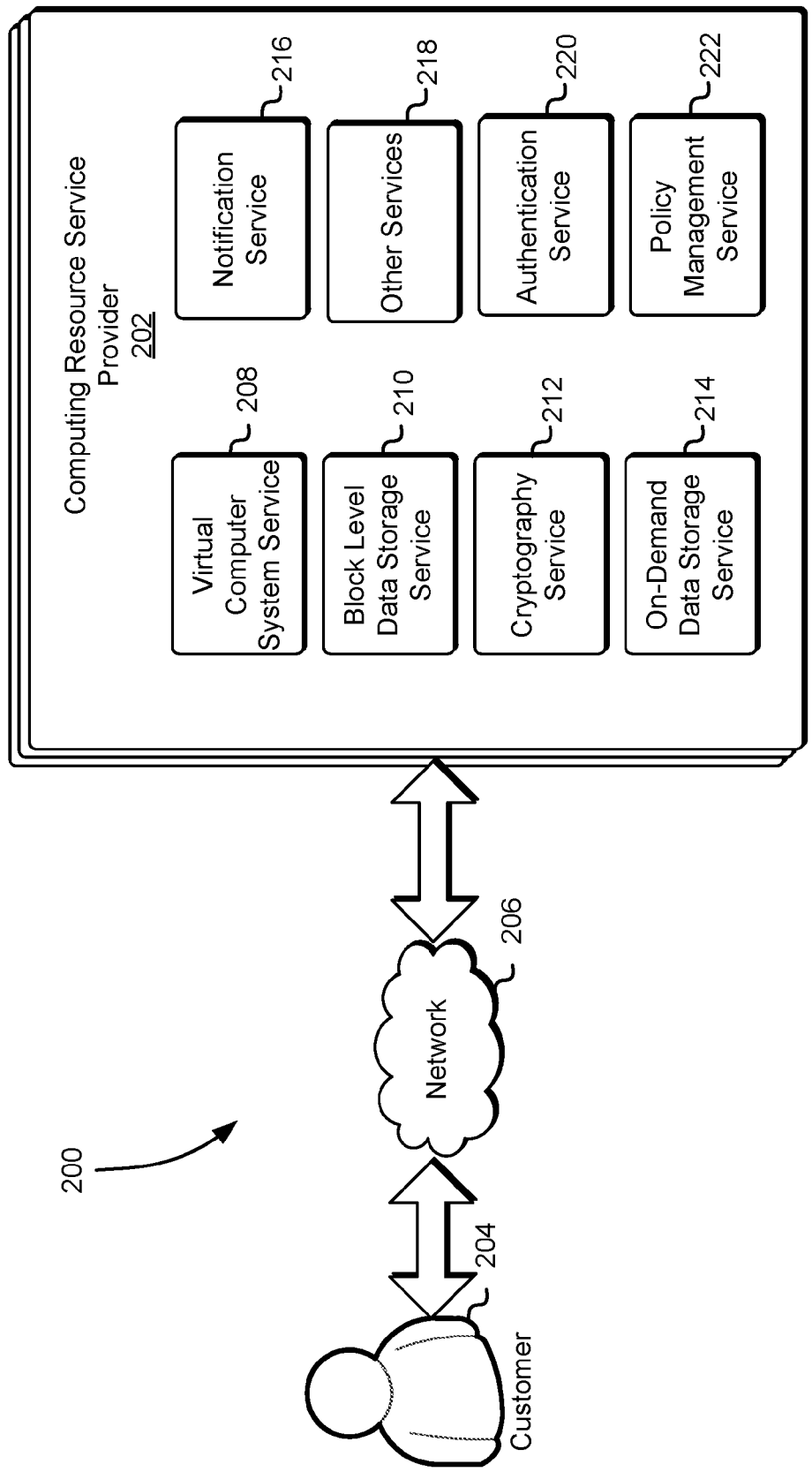
FIG. 2 shows an illustrative example of an environment in which various embodiments can be practiced.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214, and one or more other services 218, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service). In some embodiments, the customers and services utilize the same interface to submit requests to a service.

The virtual computer system service 208 may be a collection of computing resources (e.g., collection of devices) configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service 212, which is described in more detail below in connection with FIG. 3.

Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties. Customers and/or other services of the computing resource service provider may specify, using key identifiers, keys to be used in performing cryptographic operations. Further, the cryptography service 212 may perform cryptographic operations using an implicitly defined (e.g., default) key for a customer and/or service. As an example, a data storage service may submit requests to the cryptography service 212 to encrypt encryption keys used to encrypt data stored by the data storage service and the cryptography service 212 may use a default master key for the data storage service.

The computing resource service provider 202 may also include an on-demand data storage service. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication service 220 and a policy management service 222. The authentication service, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. Message verification may also be performed using asynchronous cryptography and the keys used by the various parties may be selected accordingly.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination.

It should be noted that, as with all embodiments explicitly illustrated herein, variations are considered as being within the scope of the present disclosure. For example, some or all operations performed by the authentication service 220 and policy management service 222 may be combined into a single service. A single service may, for example, receive requests to verify pending customer requests and, as part of verifying pending customer requests, may determine whether electronic signatures are valid and whether any applicable policies prevent fulfillment of the request (or whether any applicable policies allow fulfillment of the request where such is required for fulfillment). Further, one or more operations performed by the authentication service 220 and/or the policy management service 222 may be performed by other services themselves without communication with the authentication service 220 or policy management service 222. Services may, for instance, have their own authentication and/or policy evaluation engines, where the authentication and/or policy evaluation engines may be updated by a central authentication service 220 and/or policy management service 222.

As discussed above, various embodiments of the present disclosure are directed to providing cryptography services. Cryptography services may be provided by a cryptography service system such as described above. FIG. 3 accordingly shows an illustrative example of a cryptography service 300 in accordance with various embodiments. As illustrated in FIG. 3 and as discussed above, the cryptography service 300 is logically comprised of a frontend system and a backend system. Both the frontend system and the backend system may be implemented by one or more computer systems configured to perform operations described herein. For example, as illustrated in FIG. 3, the frontend system of the cryptography service 300 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:

CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key).

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

Figure 3:
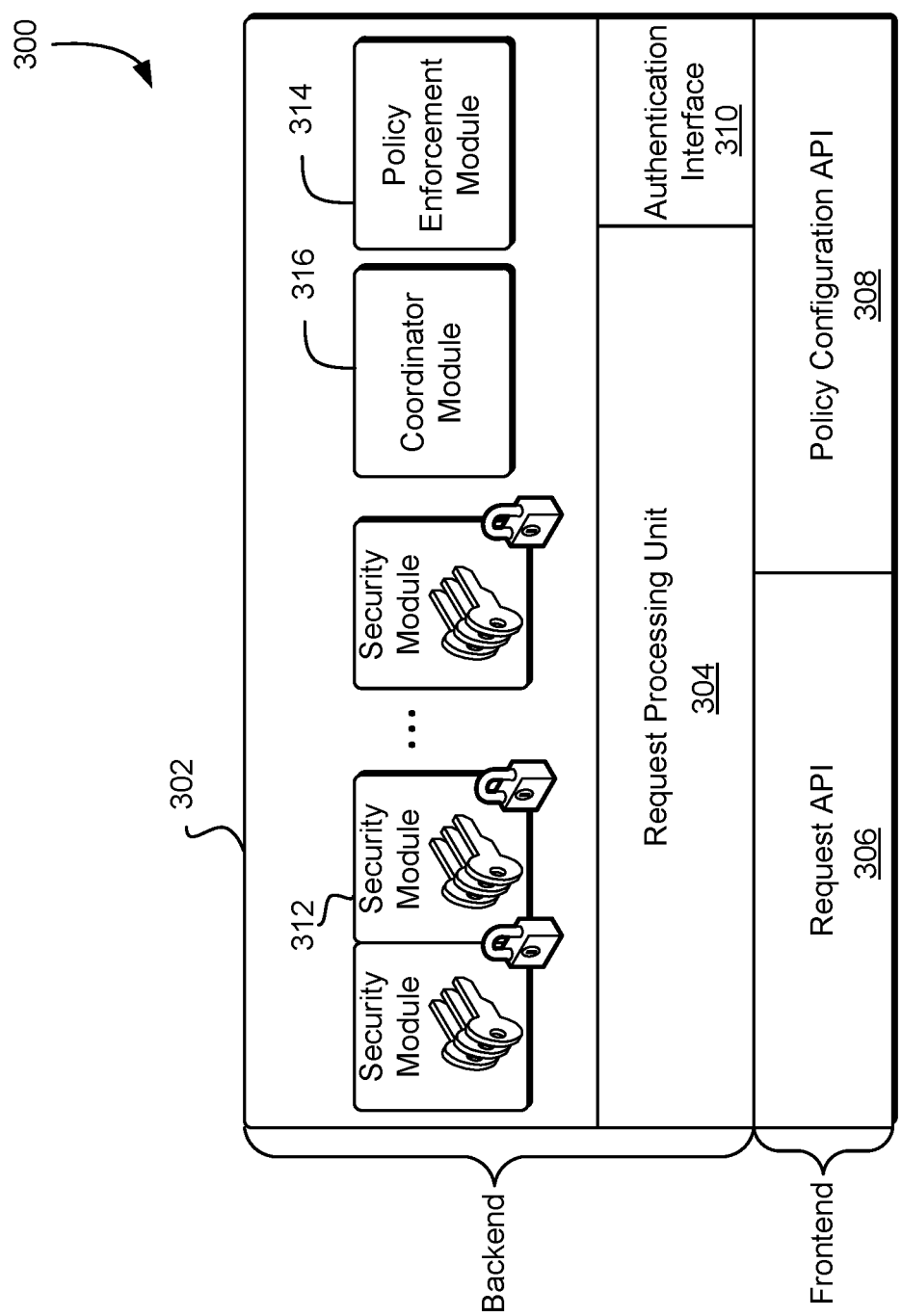
FIG. 3 shows an illustrative example of a cryptography service in accordance with at least one embodiment.

As illustrated in FIG. 3, the cryptography service 300 includes a backend system 302 that itself comprises various components in some embodiments. For example, the backend system in this example includes a request processing system (unit) 304 which may be a subsystem of the cryptography service 300 that is configured to perform operations in accordance with requests received through either the request API 306 or the policy configuration API 308. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 310 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 300 also, in this illustrative example, includes a plurality of a security modules 312 (cryptography modules), a policy enforcement module 314, and a coordinator module 316. An example coordinator module 316 is the security module coordinator 1604 discussed below in connection with FIG. 16. Returning to FIG. 3, one or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 300 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 300 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 3 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 4:
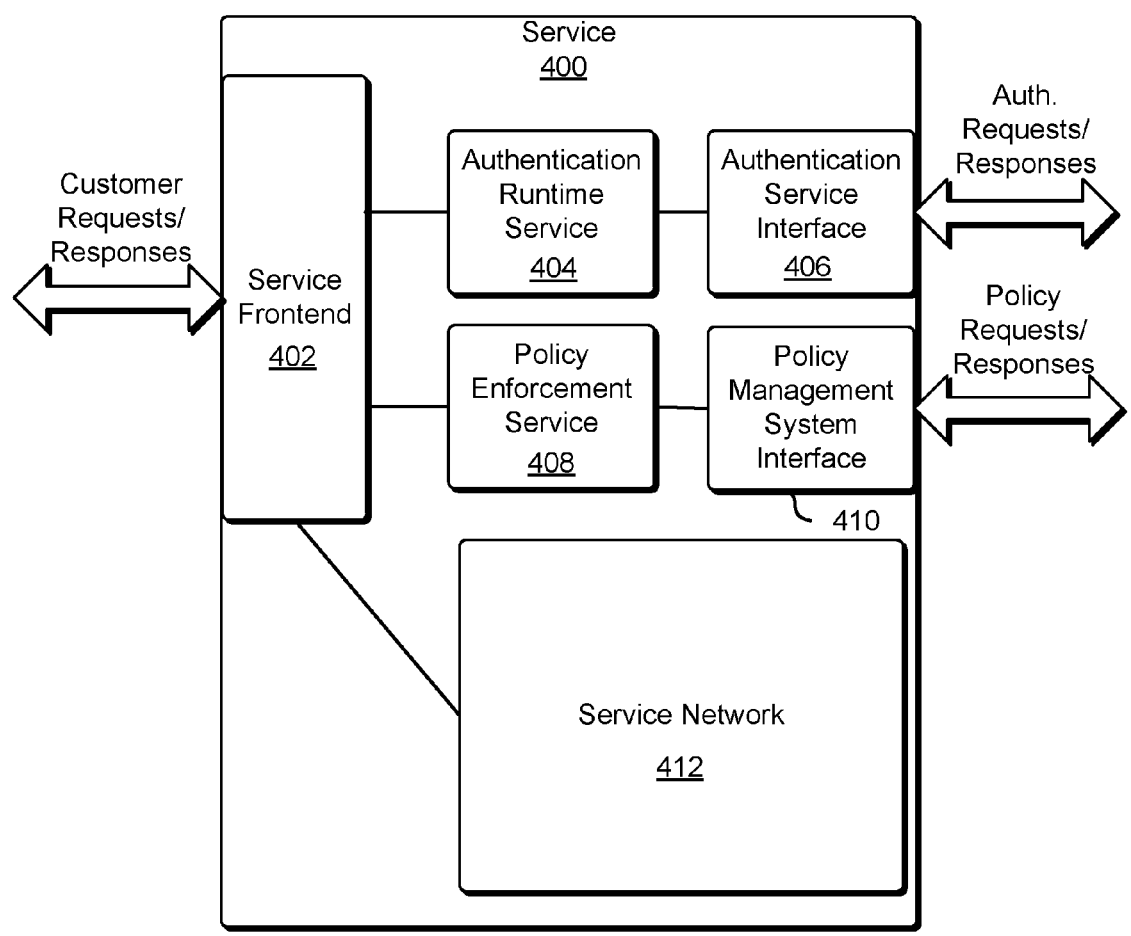
FIG. 4 shows an illustrative example of a service in accordance with at least one embodiment.

FIG. 4 shows an illustrative example of a service 400 in accordance with various embodiments. The service 400 may be, for example, one of the services described above in connection with FIG. 2. For example, the service 400 could be a virtual computer system 208, a block data storage service 210, a cryptography service 212, an on-demand data storage service 214, a notification service 216, or one or more other services 218 such as describe above. It should be noted that while FIG. 4 illustrates various components of the service 400, the various service will vary in accordance with various and may include components different than those illustrated herein. As illustrated in FIG. 4, the service 400 includes a service frontend 402. The service frontend 402 may include a collection of computing resources collectively configured to provide an interface by which customers can communicate such as through application programming interface (API) calls to the frontend service 402. The frontend service 402, for instance, may include one or more web servers, one or more load balancers, one or more application servers, and generally other computing resources described herein.

In an embodiment, the service frontend 402 is configured to receive customer requests and provide responses to those requests. The service frontend 402 may also include an interface that enables the receipt and processing of requests from other services. In order to process the requests, the service frontend 402 may interact with various other components of the service 400. For example, as illustrated in FIG. 4, the service 400 includes an authentication runtime service 404. The authentication runtime service 404, like the service at frontend 402, may be a subsystem of the service 400 comprising a collection of computing resources collectively configured to make determinations regarding authentication to enable the service frontend 402 to deny or fulfill requests as appropriate. In an embodiment, when the service frontend 402 receives a request the service frontend 402 communicates with the authentication runtime service 404 to determine whether the request is authentic. The request may, for instance, include an electronic signature generated using a secret shared among the customer and an authentication service such as described above in connection with FIG. 2. The authentication runtime service 404 may transmit information via an authentication service interface 406 which enables the authentication runtime service 404 to obtain determinations from an authentication service such as described above in connection with FIG. 2, whether the request is authentic. In operating to determine whether requests are authentic the authentication runtime service 404 may cache certain information in order to enable the authentication runtime service 404 to make a determination regarding authentication without authentication to an authentication service through the authentication service interface 406. It should be noted that while FIG. 4 illustrates a particular embodiment, the service 400 may authenticate requests in any suitable manner and not necessarily in the manner shown.

As illustrated in FIG. 4 the service frontend 402 also communicates with a policy enforcement service 408 in order to determine whether to fulfill certain requests. The policy enforcement service 408 may be a subsystem of the service 400 that comprises the collection of computing resource collectively configured to enable the service frontend 402 to determine whether to fulfill or deny requests. As with the authentication runtime service 404, the policy enforcement service 408 may communicate with a policy management system (not illustrated in the figure) for the purpose of determining whether fulfillment of a request is in compliance with the policy. For example, when the service frontend 402 receives a request, it may transmit the request or information based at least in part on the request to the policy enforcement service 408. The policy enforcement service 408 may transmit information, via a policy management system interface 410, to a policy management system in order to make the determination. As with the authentication runtime service 404, the policy enforcement service 408 may cache various information in order to enable determinations of whether fulfillment of requests comply with policies without communicating with the policy management system.

In various embodiments, the service frontend 402 also communicates with a service network 412 when received requests are determined to be both authentic and fulfillable in compliance with policy. The service network 412 may be a subsystem of the service 400 comprising a collection of computing resources configured to operate in support of providing a service. For example, in an embodiment whether the service 400 is a virtual computer system service, the service network 412 may comprise a plurality of physical host computing devices that implement virtual computer systems on behalf of customers of the service 400. Requests through the service frontend 402 may relate to operation of the virtual computer systems implemented using the service network 412. For instance, requests may be submitted to the service frontend 402 for the purpose of provisioning, deprovisioning, modifying, or otherwise remotely managing virtual computer systems. In the example of a block data storage service, the service network 412 may comprise a collection of data storage servers with corresponding data storage devices. The service frontend 402 may interact with the service network 412 for various purposes such as allocating storage space to customers, deallocating storage space for customers, and generally in connection with management of one or more virtual block level data storage devices provided by the service 400. In the example of a cryptography service, the service network 412 may include various hardware devices that enable the secure management of cryptographic keys. For example, the service network 412 may comprise a plurality of security modules (e.g., hardware security modules) which may be devices that securely store cryptographic key material. The service network for a cryptography service may also include data storage devices for storing keys on behalf of customers and generally other devices supporting operation of the cryptography service. In the example of an on-demand data storage service, the service network 412, as with the block data storage service, may include data storage servers and corresponding data storage devices. The service network may also include one or more databases in order to operate as key value stores to enable the efficient location of data within the service network 412. The service network 412 may also include other devices (e.g., server computer systems), such as devices that operate to durably, i.e., redundantly store data to perform garbage collection processes and the like. Generally, the service network 412 may include computing resources applicable to the service being provided. Also, while not illustrated, the service network 412 may include appropriate networking devices such as routers, switches, load balancers, and other devices that enable the collective operation of the devices in the storage network 412. Of course, the exact resources that are included and their collective configuration will vary in accordance with the various services and the various embodiments in which they are implemented.

Figure 5:
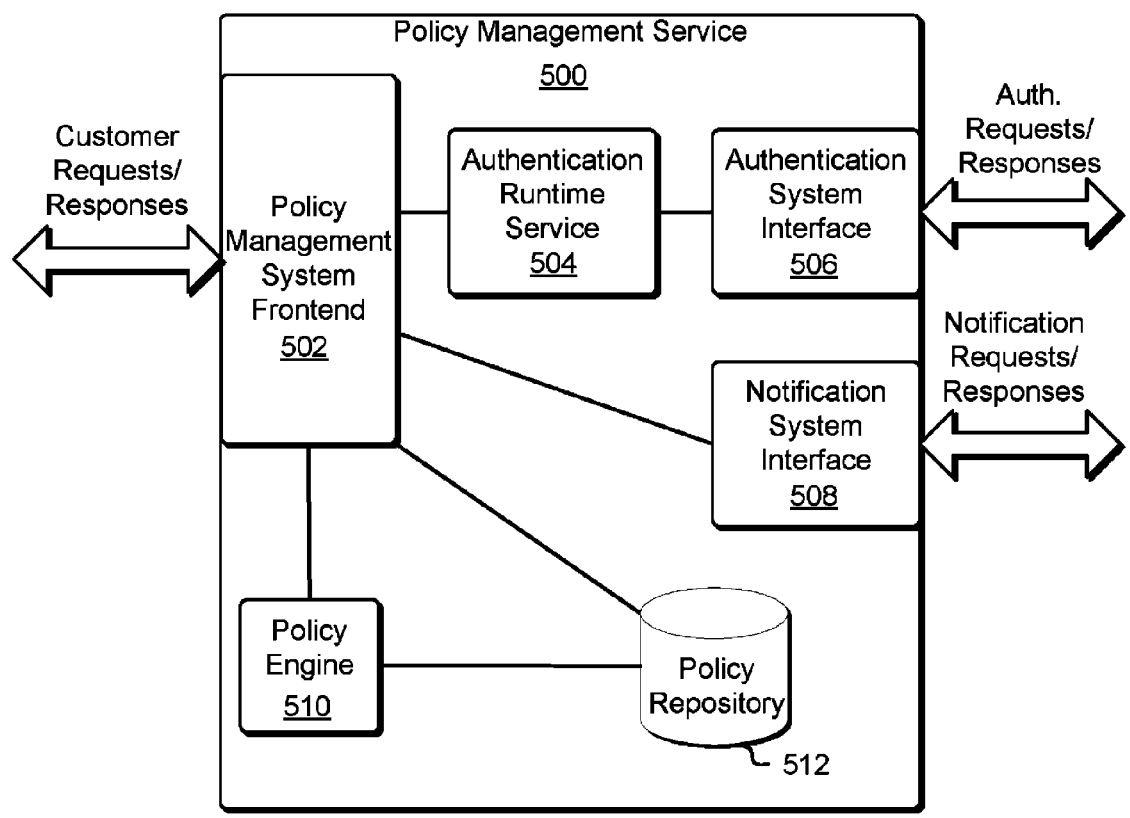
FIG. 5 shows an illustrative example of a policy management service in accordance with at least one embodiment.

FIG. 5 shows an illustrative example of a policy management service 500 in accordance with various embodiments. As illustrated in FIG. 5 the policy management service 500 includes a policy management system frontend 502. The policy management system frontend 502 may be configured such as the service frontend 402 described above in connection with FIG. 4. In particular, the policy management system frontend 502 may be configured to receive customers' requests and provide responses to those requests. The policy management system frontend 502 may also be configured to receive requests from other services, such as for determinations whether requests are fulfillable according to policy. Requests to the policy management system frontend 502 may be various requests in connection with the management of policy or an account of a computing resource provider. For example, a request to the policy management system frontend may be an appropriately configured API call to add a policy, to delete a policy, to change a policy, and generally to perform various actions in connection with policies, such as providing an inventory of policies and the like. Addition and/or change of policy may be accomplished through the receipt of definitions of policies, which may comprise structured sets of information specifying parameters that define corresponding policies. An illustrative example of how a policy may be organized is discussed below in connection with FIGS. 9 and 10.

As with other frontend systems described herein, the policy management system frontend 502 may include one or more webservers that perform different operations. For example, in an embodiment, the policy management system frontend 502 may include a webserver that provides, over a network such as the Internet, a console interface for managing policies. The console interface may be a graphical user interface (GUI) with various GUI controls that allow users to perform various actions in connection with the management of policy. Example actions include the definition of policies and submission of defined policies. A user may, for instance, use various GUI controls (drop down menus, check boxes, text entry boxes and the like) for defining a policy and then interact with the GUI to cause the webserver to submit the defined policy. Submission of the defined policy in a request (or, generally, submission of any request transmitted via the GUI), may cause the request to be transmitted from the webserver providing the GUI to another webserver that orchestrates the processing of the requests, such as described below. The other webserver may also be available to customers for submission of requests directly instead of through the webserver providing the GUI. Other variations are also considered as being within the scope of the present disclosure.

As with the service 400 described above in connection with FIG. 4, the policy management service 500 may include an authentication runtime service 504 and an authentication system interface 506 in order to enable the policy management system frontend 502 to fulfill or deny requests as appropriate. As with the service frontend 402, the policy management system frontend 502 may interact (e.g., via appropriately configured communication signals) with various components in order to provide policy management services. For example, as illustrated in FIG. 5, the policy management system frontend 502 may utilize a notification system interface 508 to communicate with a notification system such as described above. The notification system may be used in order to alert users associated with an account of certain types of activity in connection with one or more policies of the account. For example, as noted in more detail below, attempted additions to a set of policies for the account may cause the policy management system 502 to cause the notification system to provide one or more notifications of the attempted policy addition. In this manner, receipt of the notification enables appropriate action to be taken such as when addition of a policy is improper.

The policy management system frontend 502, in an embodiment, utilizes a policy engine 510 which may be a subsystem of the policy management service 500 comprising a collection of computing resources collectively configured to evaluate policy. The policy engine 510 may receive from the policy management system frontend 502 a request that has been received and/or information based at least in part thereon. The policy engine 510 may identify any policies applicable to the request, evaluate whether fulfillment of the request is in compliance with any applicable policies, and provide notification to the policy management system 502 whether fulfillment of the request is in compliance with existing policy. The policy engine 510 may operate in various ways in accordance with various embodiments. For instance, as discussed below, policies may be encoded in policy documents which encode various information regarding principals, such as users, and conditions for the principals' access to computing resources such as cryptographic keys, data objects, logical containers for data objects and other items to which policies apply. The policy engine (or another system working in concert with the policy engine) may use the information in the policies to determine which of a set of policies apply to a particular request. For example, if a request is submitted by a particular identity identified in the request, the policy engine may select policies applicable to that entity. If the request involves a particular resource, the policy engine may select policies that are applicable to the particular resource. In addition, as discussed in more detail below, policy documents may include information that is indicative of whether the policy document is currently effective (i.e., whether one or more policies encoded in the policy document are currently enforced), such as information indicating time when effectiveness of one or more policies encoded in the policy documents begins. Identifying applicable policy documents may include selecting policy documents that are in force and disregarding policy documents that are not in force.

The policy engine may sequentially or otherwise process the policies to determine whether each of the selected policies allow fulfillment of the request. The policy engine may transmit a notification (e.g., in the form of a response to a request to evaluate policy submitted by the policy management system frontend system 502) to the policy management system frontend system 502 that indicates whether the set of policies for an account corresponding to the policies allows or precludes fulfillment of the request. Additional information, such one or more reasons fulfillment of the request is precluded by policy (e.g., information identifying one or more policies that would be violated by fulfillment of the request and/or information based at least in part on the policies that would be violated by fulfillment of the request).

To enable large scale policy management for multiple users, the policy management service 500 may include a policy repository 512 which may comprise one or more data storage devices that store policy documents that encode policies of the various accounts of computing resource service provider. In some embodiments, the policy repository 512 stores policies for multiple entities (e.g., customers of a computing resource service provider) and, accordingly, stores policies in direct or indirect association with the entities to which the policies correspond.

As illustrated in FIG. 5, the policy management system frontend 502 upon receipt of a request may utilize the authentication runtime service 504 to determine whether the request is authentic. If the request is authentic, the policy management system frontend 502 may submit a policy evaluation request to the policy engine 510 to determine whether the request is in compliance with applicable existing policy. The policy engine 510, if it does not have such information cached, may interact with the policy repository 512 in order to obtain applicable policies. The policy engine 510 may, for example, access all policies for an account associated with the request from the policy repository 512 and identify from the access policies any policies which are applicable to the request. As noted, the policy engine may cache policies in order to avoid communication with the repository 512 which may be implemented across a network from the policy engine 510.

For certain types of requests, the policy management system frontend 502 may interact with the policy repository 512. For example, if such actions are allowed by existing policy the policy management system frontend 502 may transmit new policies to the policy repository 512, may transmit commands to the policy repository 512 to delete one or more policies, and/or generally to change a set of policies or an account associated with the request (e.g., by modifying an existing policy).

As noted above, various policies utilized by customers of a computing resource service provider may be encoded in the form of policy documents. The policy document in an embodiment is a document, i.e., organized collection of information, that operates as a container for one or more statements. The policy document may be a Javascript Object Notation (JSON), an eXtensible Markup Language (XML) document, another document using a structured markup language, or other way of organization information. It should be noted that a policy document may encode one or more policies that are defined by corresponding statements. It should also be noted that a policy may include one or more sub-policies. In other words, a policy may comprise a collection of policies. For example, an account of a computing resource service provider may have a policy for a data storage service ("data storage service policy") that comprises a plurality of individual policies, each defining a specific permission. Additionally, it should be noted that the term "policy" may have different meanings in different contexts. As an example, the term "policy" can have a different meaning when used as an uncountable (mass) noun than when used as a countable (count) noun. For instance, a phrase such as "whether policy allows fulfillment of a request" may be interpreted to mean whether a collection of individual policies allows fulfillment of the request. Also, while policy documents are used for the purpose of illustration, other ways of encoding policies (e.g., by using relational tables of a relational database to store the various information that would be encoded by a policy document) may be used in accordance with various embodiments. A statement may include conditions which may be any restrictions or details about the statement. The conditions, for example, may specify circumstances for a policy to be in effect.

In various embodiments, policies are able to define conditions for changing a set of policies, such as a set of policies for an account of a computing resource service provider. A policy on policy addition (which may be referred to as a "policy addition policy") may require that, to be fulfillable, a request to add a proposed policy to a set of policies must be configured such that the proposed policy will not become effective (i.e., be enforced by a system that enforces the set of policies) until a future time, such as a specified number of hours into the future measuring from some reference point in time. The policy on policy addition may define the set of principals to which the policy applies, the resources to which the policy applies, one or more other conditions that must be fulfilled, and one or more actions in addition to denial if the conditions are not fulfilled (or, alternatively, allowance if the conditions are fulfilled). An additional action defined by the policy may, for instance, include one or more actions that result in notification of one or more principals of a request to add a policy. A policy administrator may, for instance, allow one or more others to add policies to a set of policies, but may configure a policy on policy addition such that the policy administrator can add policies without a required delay, but the allowed one or more others can only successfully add policies if the policies are added so as to become effective in compliance with a required delay.

Figure 6:
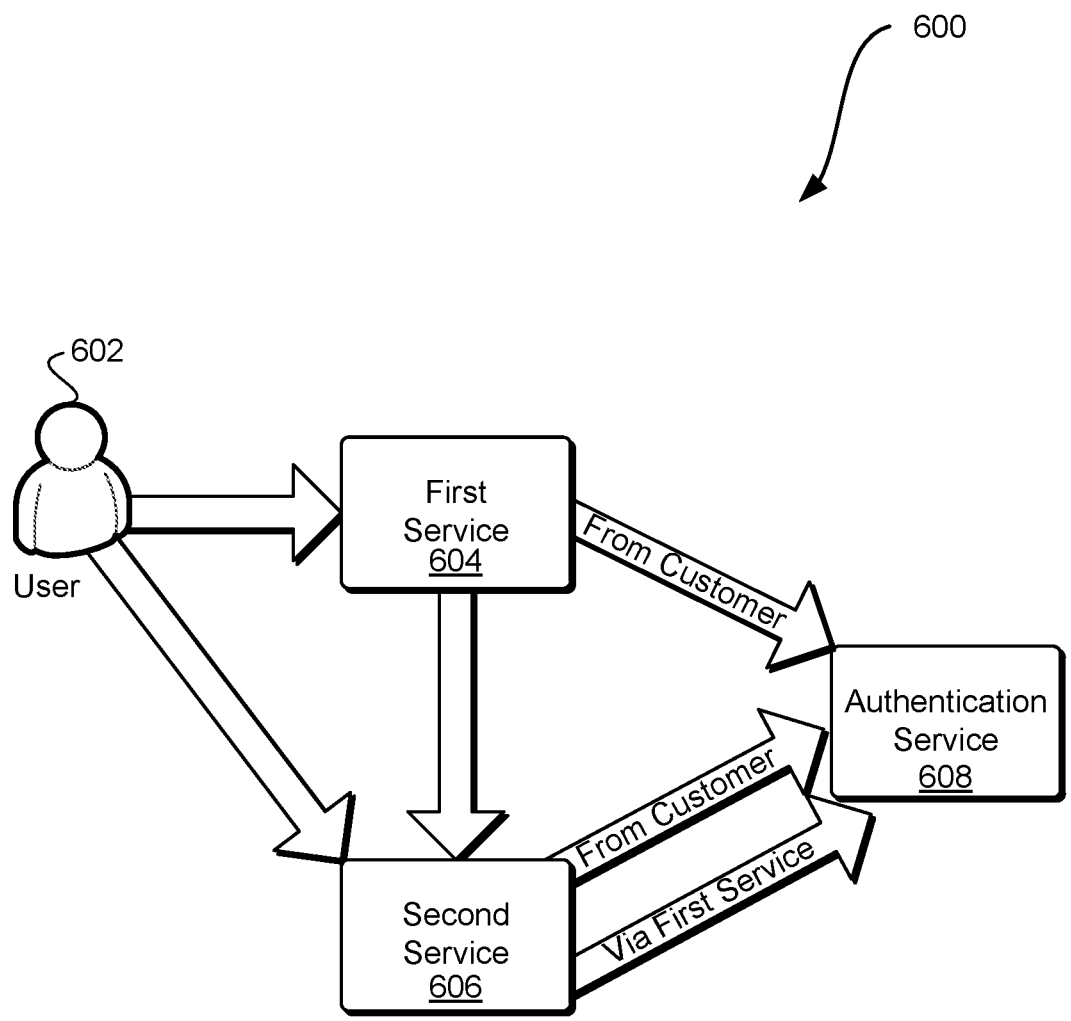
FIG. 6 shows an illustrative example of an environment in which various embodiments can be practiced.

FIG. 6 shows an illustrative example of an environment 600 in which various embodiments can be practiced. As illustrated in FIG. 6, the environment 600 includes a user 602, a first service 604, and a second service 606, such as described above in connection with FIG. 1. Also as illustrated in the environment 600 is an authentication service 608 such as described above. In an embodiment, the first service 604 and second service 606 are configured to communicate with the authentication service 608 in order to determine whether requests submitted to the first service 604 and second service 606 should be fulfilled, such as described above in connection with FIG. 4. For example, in some embodiments, the user 602 submits requests with electronic signatures of the requests where the electronic signatures are generated by the user 602 so as to be verifiable by the authentication service 608. The user 602 may, for instance, electronically sign the request using a cryptographic key that is held secret between the user 602 and the authentication service 608. As another example, the user 602 may use an asymmetric electronic signature algorithm to electronically sign requests using a private key of a public-private key pair. The authentication service 608 may verify electronic signatures of requests using a public key of the public-private key pair possibly communicating with a certificate authority as part of the verification process. Generally, any way by which requests may be authenticated are considered as being within the scope of the present disclosure.

In the illustrated example, when a service receives a request from the user 602, the service transmits the request and an electronic signature of the request to the authentication service 608. The authentication service 608 may verify the electronic signature and provide a response to the service that submitted the request. The response may be based at least in part on whether the electronic signature is valid. If the authentication service 608 determines that the electronic signature is valid (and in some embodiments that the request is otherwise fulfillable), the authentication service 608 may provide a response that the electronic signature is valid. The service may then fulfill or cause to have fulfilled the request.

In some embodiments, the service that receives the request from the user 602 that is verified by the authentication service 608 fulfills the request entirely by itself. In some embodiments, however, fulfillment of a request may involve utilization of one or more other services by submitting requests to the one or more services. As illustrated in FIG. 6, for example, if the user 602 submits a request to the first service 604, the first service 604 may verify the request with the authentication service 608. Fulfillment of the request 604 may include performing one or more operations which, as illustrated in FIG. 6 may include the first service 604 submitting a request to the second service 606. In an embodiment, when the second service 606 receives a request from the first service 604, the second service 606 communicates with the authentication service 608 in order to determine whether to fulfill the request. Based at least in part on a request from the authentication service 608, the second service 606 may perform one or more operations involved in fulfillment of the request. While FIG. 6 shows two services, fulfillment of a request may include more than two services. For example, the role of second service 606 in fulfillment of a request from the first service 604 may include submission of one or more requests to yet another service not pictured in the figure. As illustrated in FIG. 6, the user 602 may, in some embodiments, submit requests directly to the second service 606.

As illustrated in the figure, communications between services and the authentication service 606 may be configured so as to identify information about a pending request. For example, when the user 602 submits a request to the first service 604, the first service 604 may transmit a communication to the authentication service 608 indicating that the request was received from the customer. Further, the second service 606 as noted may receive requests from the first service 604 and/or the user 602. Accordingly, communications from the second service 606 to the authentication service 608 may indicate whether the request being verified is from the first service 604 or the user 602. In this manner, the authentication service 608 may operate differently depending on whether the request was received from the first service 604 or the user 602 regardless of whether the request was nevertheless on behalf of the user 602.

Figure 7:
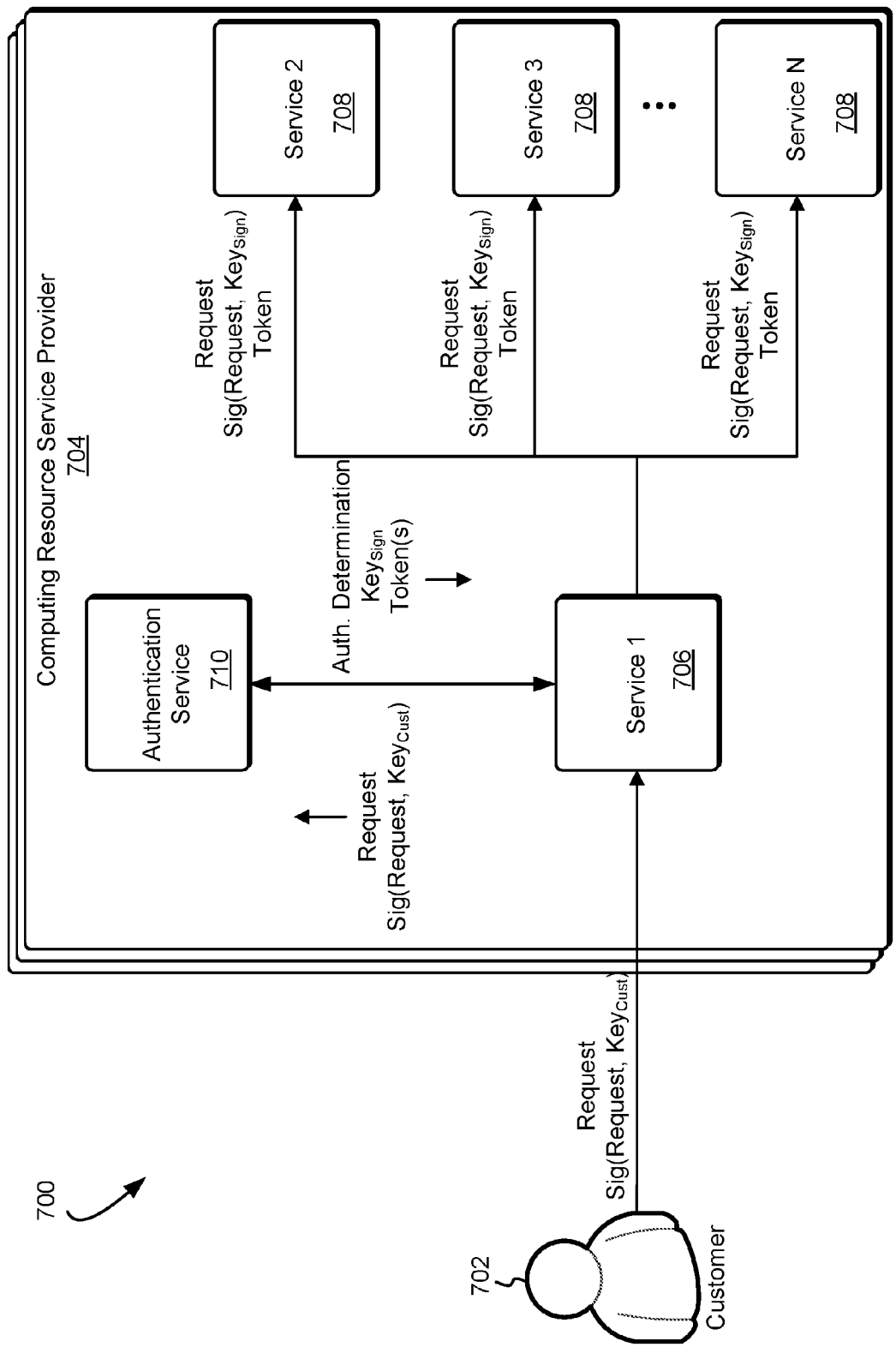
FIG. 7 shows an illustrative example of an environment in which various embodiments can be practiced where the figure illustrates how services are accessible in accordance with at least one embodiment.

FIG. 7 shows an illustrative example of an environment 700 which may be used to implement various aspects of the disclosure. In FIG. 7, the environment 700 includes a customer 702 of a computing resource service provider 704. The computing resource service provider may host a plurality of services such as a first service 706 and one or more other services 708. An authentication service 710 may be configured within the environment 700 with authority to manage access control with respect to the various services of the computing resource service provider 704. In an embodiment, the first service 706 is configured to utilize one or more other services 708 in its operations. The first service 706 may, for example, be a service that is used by the customer 702 to manage computing resources managed by the other services 708. The first service 706 may, for instance, be configured to utilize templates for networks that are implementable using one or more services of the computing resource service provider 704, thereby providing customers the ability to set up networks for various purposes with less technical knowledge and/or less effort than would otherwise be required.

In some embodiments, the environment 700 and in particular the computing resource service provider 704 is configured such that the first service 706 is able to access the one or more other services 708. The other services 708 are able to determine whether requests from the first service are authentic, where authenticity may depend on requests from the first service 706 being submitted with proof of a pending request from the customer. In some embodiments, one or more of the other services 708 communicate with the authentication service 710 to validate requests from the first service 706. Further, in some embodiments, one or more of the other services are configured to validate requests from the first service 706 without communication with the authentication service 710. In other words, the computing resource service provider 704 may operate such that information from the first service 706 is sufficient for authentication of requests, but determinations on authentication is ultimately controlled by the authentication service 710. For instance, instead of a single request from the customer 702 causing the authentication service 710 to communicate with two separate services, a single request from the customer 702 may result in utilization of multiple services with only one service communicating with the authentication service 710. In this manner, load on the authentication service 710 is reduced, better latency with the authentication service 710 is attained, network resources are freed up and other advantages are achieved.

Verification of a request from a service without communication with the authentication service 710 may be accomplished through the passage of appropriately configured information. For example, as illustrated in FIG. 7, the customer 702 may submit a request and an electronic signature for the request to the first service 706. The electronic signature may be generated using a customer key (key accessible to the customer). Upon receipt of the request and the electronic signature for the request, the first service 706 may provide the request and the electronic signature to the authentication service 710. The authentication service 710 may provide, in response to the request from the first service 706, an authentication response comprising an authentication determination and additional authentication information. The additional authentication information may include a signing key usable to sign requests to one or more other services so as to be verifiable by the one or more services (e.g., by submitting an authentication request to the authentication service 710 to verify a signature generated using the signing key).

The additional authentication information may also include one or more tokens, where the one or more tokens may be specific to one or more services. A token may comprise a service-specific authentication response which may be a response that a corresponding service 708 would receive from the authentication service 710 if the service 708 were to submit the an electronic signature generated using the signing key to the authentication service 710 itself (or information that, due to the manner in which the corresponding service is programmed, is functionally equivalent to a response that the corresponding service 708 would have received from the authentication service 710 had the corresponding service 708 submitted the signature to the authentication service 710 itself). The service-specific authentication response may include information specific to the corresponding service 708, such as described above. For instance, the service-specific authentication response may include policy associated with the customer 702 and applicable to the corresponding service 708, an attestation to the identity of the customer 702, and an electronic signature generated based at least in part on a secret key shared between the corresponding service 708 and the authentication service 710 (but lacked by other services), where the electronic signature is usable by the corresponding service 708 to verify the authenticity of information provided in the service-specific authentication response. The token may include a signing key that is included in the authentication response and/or a derivation thereof. Further, the token may be encrypted such that a corresponding service (e.g., the second service in FIG. 7) can decrypt the token, but such that other, non-corresponding services cannot decrypt the token due to lack of an appropriate cryptographic key. For instance, one or more tokens may be encrypted using a secret key shared exclusively between the corresponding service and the authentication service.

In other words, the first service 706 receives information the same as or functionally equivalent to information that another service 708 would have received in response to a communication with the authentication service 710 to determine whether or not to perform one or more operations. In addition, the token may be provided to the first service in the form of an authentication response that another service (e.g., in the figure, Service 2 through Service N) would have received had the other service contacted the authentication service itself. In this manner, the first service 706 may digitally sign requests to other services using a signing key provided by the authentication service 710 and provide, with the requests and signatures, an appropriate token to another service utilized in fulfilling a request from the customer 702. For example, a token associated with a request from the customer may correspond to a second service 708 labeled in the figure as Service 2. The first service may provide the request, a signature of the request using a signing key from the authentication service 710 and the token to the second service 708. In this manner, the second service 708 may utilize the its own secret key shared with the authentication service 710 to decrypt the token, obtain a signing key or derivation thereof from the decrypted token, and use the signing key (or derivation thereof) to determine whether the generated key matches the provided token.

In other words, the second service 708 is able to utilize the information provided from the first service 706 in order to determine whether or not to perform one or more operations in response to a communication from the first service 706. The second service 708 therefore does not need to communicate with the authentication service 710 to determine whether to fulfill the request from the first service. However, the second service is able to determine whether to perform one or more operations under authority of the authentication service 701 because of the use of secret information shared with the authentication service 710. In addition, the information usable by the second service 708 to determine whether to perform one or more operations is information that the first service is unable to utilize or access due to having been generated using secret information that is shared by the authentication service 710 and the second service 708, but that which the first service 706 lacks. Further, since the token received from the second service 708 from the first service 706 contains information in the form of an authentication response that the second service 708 would have received had it contacted the authentication itself to verify the signature, the second service 708 is able to cache some or all of the information from a token or information derived therefrom and utilize a cache for future requests from the first service.

As with all environments illustrated herein, variations are considered as being with the scope of present disclosure. For example, in FIG. 7, a first service communicates with an authentication service in response to a request received from a customer of a computing resource service provider. It should be noted that the scope of the present disclosure extends to embodiments where a synchronous request from the customer 702 does not necessarily precede the transfer of information as illustrated in FIG. 7 and variations thereof. As one illustrative example, referring to FIG. 7, the first service 706 may be an auto-scaling service that measures various activity in connection with computing resources managed by the computing resource service provider and performs scaling operations in response thereto. As one example, if a customer utilizes the computing resource service provider to operate a website, the auto-scaling service may add or subtract web servers supporting the website as appropriate. Such auto-scaling operations may be performed without a synchronous customer request present. That is, the operations may be performed in response to one or more triggers that do not include a pending request from the customer, although the customer may have submitted a request asynchronously (e.g., to set up auto-scaling) prior to any auto-scaling operations.

As an example of another variation as considered within the scope of the present disclosure, FIG. 7 illustrates certain information being provided to each of the other services 708. Additional information may be included as well. For example, each of the services 708 may be provided the tokens for each of the services 708 (or s subset thereof). Each of the services 708 may share secret information with the authentication service that the other services 708 and the service 706 lack. In this manner, the first service 706 may provide to each service both information that is usable by that service to determine whether to perform one or more operations and other information that is not usable by that service (because it cannot be decrypted, e.g.). In this manner, this first service is not required to determine which service gets which information and the services 708 can each make such determinations on their own.

Figure 8:
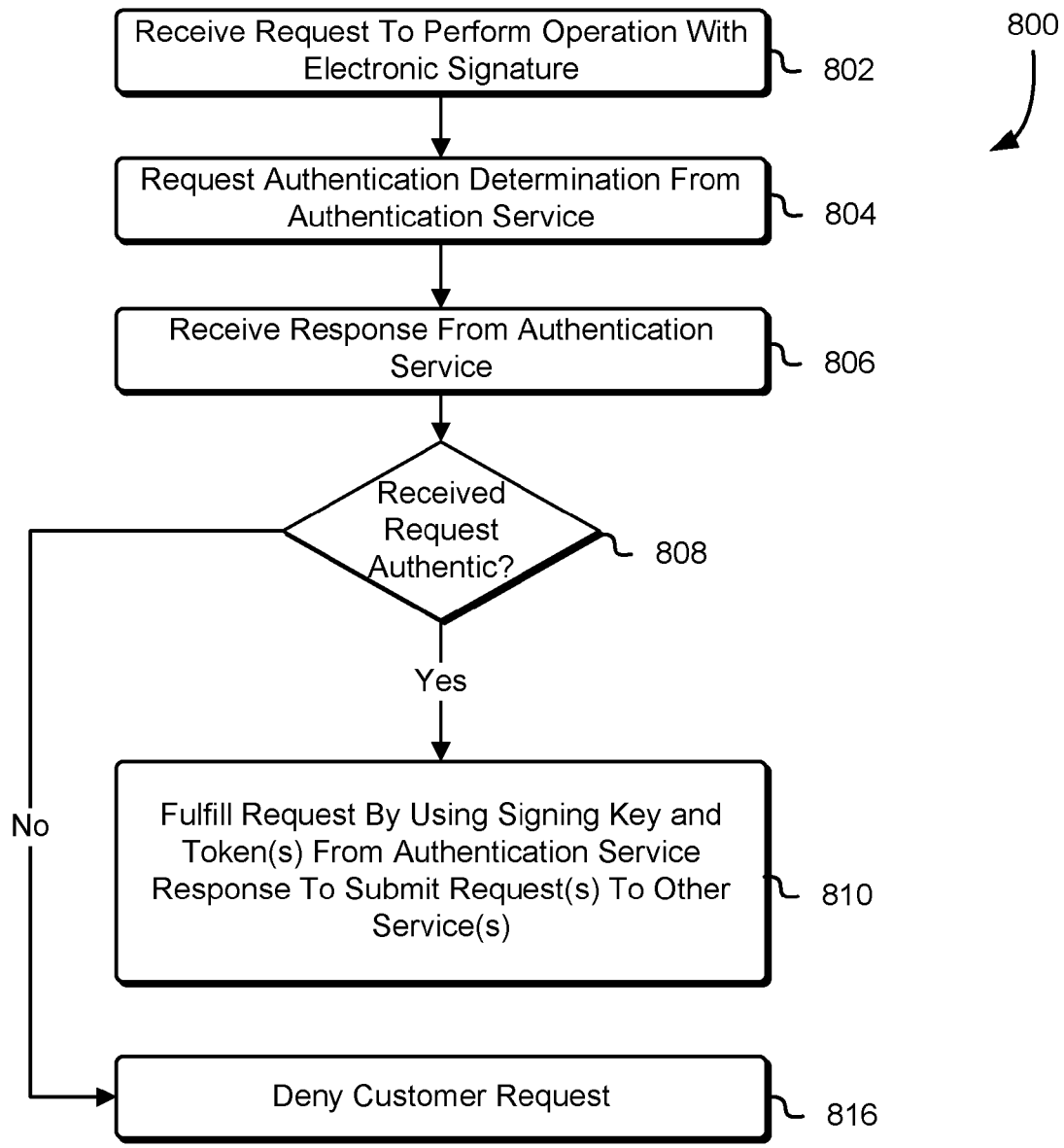
FIG. 8 shows an illustrative example of a process for evaluating a request in accordance with at least one embodiment.

FIG. 8 shows an illustrative example of a process 800 for managing access to computing resources in accordance with an embodiment. The process 800 may be performed by any suitable system such as by a service, discussed above, or a customer computing device. In an embodiment, the process 800 includes receiving 802 a request to perform one or more operations with an electronic signature. In other words, the process 800 includes receiving 802 a customer request and an electronic signature generated based at least in part on the request. Receipt 802 of the request and electronic signature may be performed over a network, such as the Internet. The request and signature may be provided, for instance, in a web service call to a system performing the process 800. In some embodiments, such as embodiments where a customer system receives 802 the request, the request may be received internally, such as over an internal network or internally within a computing device.

Upon receipt 802 of the request and electronic signature, the process 800 may include requesting 804 an authentication determination from an authentication service such as described above. As discussed above, requesting 804 an authentication determination may be performed by submitting an authentication request to an authentication system. Accordingly, a response from the authentication service may be received 806 in response to the request 804 for the authentication determination. The response from the authentication service may be analyzed and a determination may be made 808 whether the request is authentic. For instance, the response may include an authentication determination, such as discussed above, that includes an attestation to the identity of the requestor and/or a customer (if different from the requestor, such as when the request was received from a service on behalf of a customer) provided as a result of a positive authentication determination. In embodiments where the request is received by a service on behalf of a customer during fulfillment of a customer request, the response may include an attestation to the existence of a pending customer request with information (e.g., an expiration) indicating an amount of time for which the attestation is valid. If it is determined 808 that the customer request is authentic, that is that the authentication response from the authentication service allows the customer request to be fulfilled, the process 800 may include fulfilling 810 the customer request by using a signing key and token from an authentication service to submit a request to another service. For instance, the process 800 may include using a signing key from the authentication service response received from the authentication service to sign a request to another service. The request to the other service may be provided to the other service with a token, which may be a token specific to the other service. An authentication response may be provided in the token or with the token, where the authentication response may be the same as or functionally equivalent to an authentication response that the one or more services would have received themselves had the one or more services provided the service-wide information to the authentication service themselves for an authentication determination from the authentication service.

Returning to process illustrated in FIG. 8, if it is determined 808 that the customer request is not authentic, then the customer request may then be denied 816. Denial of the customer request may be performed in any suitable manner, such as by providing that the request is denied, providing one or more reasons why the request was denied, by not taking any action and/or generally in any suitable manner. As noted, variations of process 800 and all processes described herein are considered as being within the scope of the present disclosure. For example, additional operations may be included in the process 800. In some embodiments, for instance, services may cache responses from an authentication service. Accordingly, the process 800 may include checking a cache to determine whether information usable to determine authenticity of the customer request has been cached. An authentication request to the authentication service may occur when such information is not found in the cache. Other variations, such as policy checks to determine whether policy allows fulfillment of the request, are also considered as being within the scope of the present disclosure.

Figure 9:
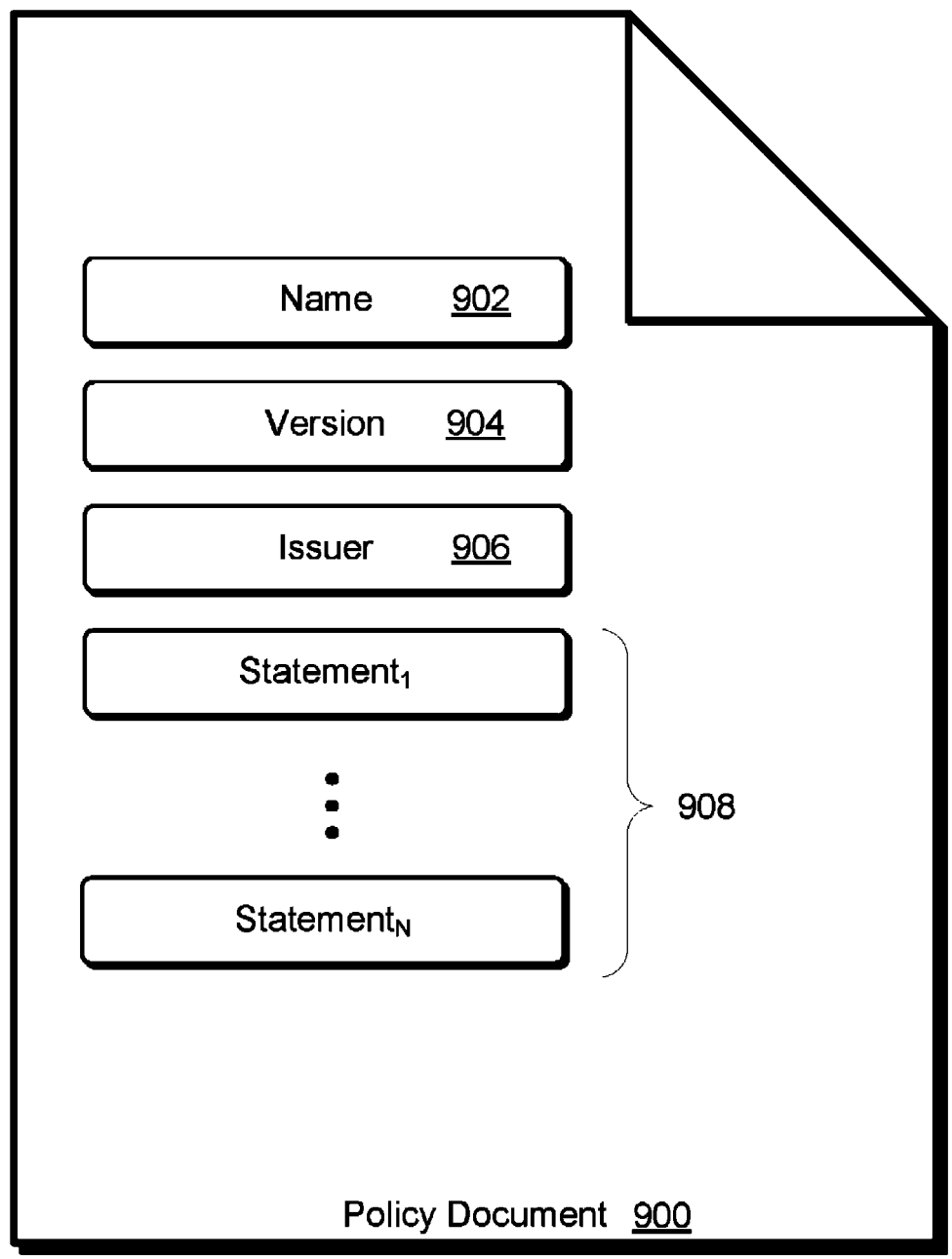
FIG. 9 shows an illustrative example of a policy document in accordance with at least one embodiment.

FIG. 9 shows an illustrative example of a policy document in accordance with an embodiment. In an embodiment, the policy document 900 encodes various information relevant to a policy encoded by the policy document. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a request to be fulfillable. As illustrated in FIG. 9, the policy document 900 includes a name 902 which may comprise a string for the policy document 900. The name 902 may, for instance, be used to provide a convenient identifier in using human readable terms. As an example, a name 902 may be a string, for instance, to the effect of "MyDataStoragePolicy." Also as illustrated in FIG. 9, the policy document 900 may include a version 904. The version 904 may be used to track how the policy document 900 changes over time as various requests are received and fulfilled to update policy. Each update to the policy document 900 may cause the version 904 to be updated to a new value. The policy document 900 may also include an issuer 906 which may be an identifier for a user that submitted a request that resulted in creation of the policy document 900 having the current version.

As illustrated in FIG. 9 and noted above, the policy document 900 may include one or more statements 908. Statements in a policy document may be processed using a logical OR. As discussed in more detail below, one or the statements 908 may encode information that indicates a future time when the policy encoded by the policy document 900 is to be effective. For example, the statement may encode a time stamp for a future time at which the policy encoded by the policy document 900 is to be effective. A statement may encode a duration indicating an amount of time that must pass before which the policy document 900 is to be effective where the duration may be measured from some point in time, which may be a global time (e.g., Unix time) or which may be measured from a particular event, such as submission of a request to add a policy that contains the statement or approval of the policy by a policy management system. Generally, the statement may encode any information that immediately or eventually renders determinable a future time at which the policy encoded by the policy document 900 becomes effective. It should be noted that statements may also contain additional information that is not illustrated in the figure, such as a statement identifier that uniquely identifies the statement (globally or within the policy document), and other information which may be used by a policy management system.

Figure 10:
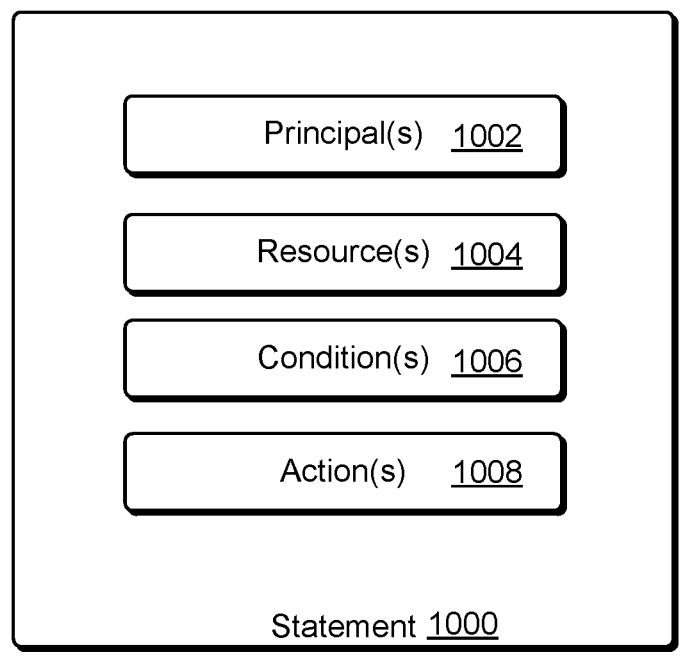
FIG. 10 shows an illustrative example of a policy statement in accordance with at least one embodiment.

As noted above, a statement may be a formal description for a permission or, generally, a formal description of one or more conditions on access to one or more resources. FIG. 10 accordingly, shows an illustrative example of a statement 1000 which may be encoded in a policy document, such as described above. As illustrated in FIG. 10, the statement 1000 may include information identifying one or more principals 1002. A principal may be an entity (e.g., user, computer system, or any entity that may be granted a permission for access to a system or resource within a system) to which the statement 1000 applies. As an example, a customer of a computing resource service provider may have an account. The account may be associated with multiple subaccounts each corresponding to a user of the customer. Each user may have a corresponding identifier which may be includable as a principal in a statement. Principals may also be identified in other ways. For example, sets of principals may be identified by an identifier for the set. As an illustrative example, a department in an organization may have a corresponding identifier. A statement may be applicable to the users associated with the department by listing in the statement an identifier for the department. Identifiers for sets of principals may be useful, for instance, when the sets are dynamically changing such as when employees are hired by and/or leave an organization and/or department therein. Generally, sets of principals may be defined based at least in part on characteristics of principals. Identifiers of principals may also be open ended. For example, information may be included that indicate that the statement 1000 is applicable to anyone, that is to all users capable of submitting a request on behalf of an account of a computing resource service provider or, generally, all users.

As illustrated in FIG. 10, a statement 1000 also identifies one or more resources 1004. Resources may be computing resources such as described above. Resources may, for instance, be the subject of the services provided by a computing resource service provider. As an example, a resource may be a virtual computer system, may be a logical data container used to associate data objects together, may be a volume identifier of a block level data storage device, a database, an item stored in a database, a data object (e.g., file) and generally any type of resource which may be provided as a service. In some embodiments, the resources are cryptographic keys, such as cryptographic keys managed by a cryptography service on behalf of customers and/or cryptographic keys used as default keys for one or more data storage services. As with principals, resources may be described using identifiers of sets of resources, which may be defined based at least in part on characteristics of resources. For instance, in some embodiments, virtual computer systems are able to be associated with user generated tags that may be descriptive of a role fulfilled by the virtual computer systems. As an example, a group of virtual computer systems may be associated with a tag "web server." Resources, accordingly, may be identified by such tags. As another example, a resource may correspond to a logical data container thereby causing the statement 1000 to be applicable any data objects stored within the logical data container, i.e., associated with the logical data container. Resources (e.g., data objects) may also be defined by keys used to encrypt the resources. In addition to the foregoing, objects to which policy applies (e.g., principals and resources) may be based at least in part on attributes which may be communicated using Security Assertion Markup Language (SAML) and/or attributes that are determined using a directory.

As illustrated in FIG. 10, a statement 1000 may also include one or more conditions. The conditions, in an embodiment, are determinative of whether the statement in the policy document applies in a particular context, i.e. applies to a submitted request in the context in which it was submitted. The conditions may utilize Boolean operators (equal, less than, etc.) to allow evaluation of the conditions over other values in the statement (principal, resource, etc.) and other values in an authorization context, which may or may not be provided in a request for which policy is being evaluated. Condition values can include date, time, the Internet Protocol (IP) address of the requester, an identifier of the request source, a user name, a user identifier, and/or a user agent of the requester and/or other values. Values may also be unique to a service to which the condition applies. Conditions may be logically connected for evaluation using logical connectors such as AND and OR.

Statements may also encode one or more actions 1008. An encoded action may represent operations that occur when the condition(s) 1006 are fulfilled and/or unfulfilled. Example actions include allowing a request to be fulfilled (e.g., allowing requested access) or denying a request. Other actions include transmission of notification in accordance with information encoded in the statement 1000, such as transmission of an electronic mail message to one or more electronic mail addresses specified in the statement 1000, publishing a notification to a topic of a notification service and/or other actions. Accordingly, an encoded action 1008 may include information sufficient for performing the action. In some embodiments, statements may lack actions when, for example, default actions are applicable. For instance a policy management system may operate so that actions are allowed (or denied) policy cause the actions to be denied (or allowed). Defaults may be system wide or may vary (e.g., with customers selecting defaults).

Figure 11:
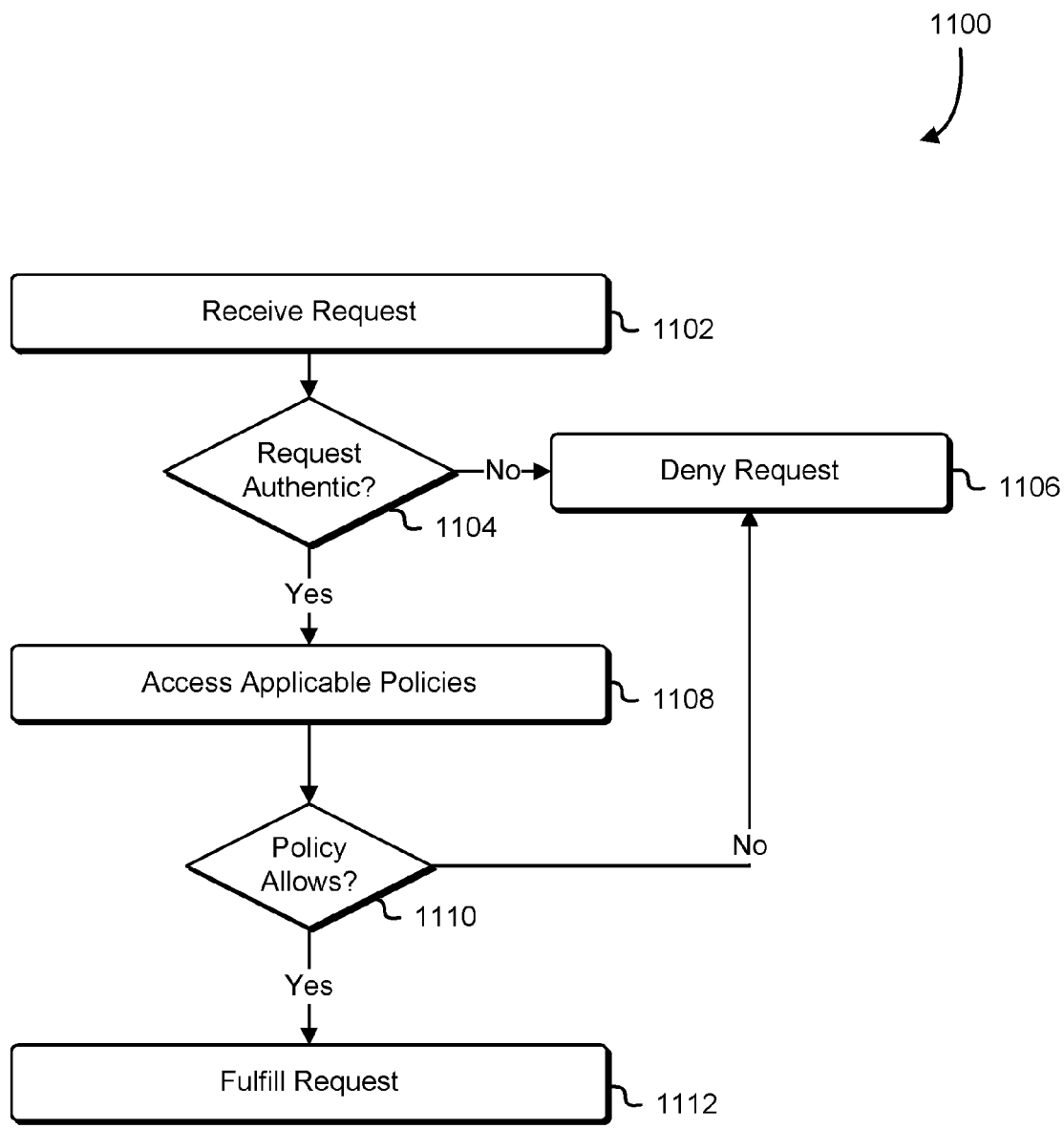
FIG. 11 shows an illustrative example of a process for processing a request in accordance with at least one embodiment.

FIG. 11 shows an illustrative example of a process for processing requests in accordance with an embodiment. The process 1100 may be performed by any suitable system or component thereof such as a service described above and/or the policy management service 400 described above. In an embodiment, the process 1100 includes receiving 1102 a request. The request may be received, for example, as an appropriately configured API call to a frontend system (e.g., comprising a web server) of a system performing the process 1100. The API call may be, for instance, in the form of a web service call configured with various parameters applicable to the request. Upon receipt 1102 of the request, the process 1100 may include determining 1104 whether the request is authentic. Determining 1104 whether the request is authentic may be performed in any suitable manner. For example, in some embodiments, the request may be signed and, therefore have an associated electronic signature. Accordingly, determining 1104 whether the request is authentic may include verifying the electronic signature. Verification of the electronic signature may be done by any suitable system or component thereof. For instance, referring to embodiments described above, an authentication runtime service or authentication service may perform the verification. It should be noted that the verification may be performed by other entities. For instance, in some embodiments, verification is not done in a distributed manner but done by a frontend system such as described above. Generally, any manner in which the authenticity of the request may be determined may be used.

If it is determined 1104 that the request is not authentic, the request may be denied 1106. Denying the request may be performed in any suitable manner, such as by responding to the request with information indicating the denial by simply taking no action and/or by providing information that indicates one or more reasons why the request is denied and/or additional information which may be necessary to enable addressing the reason for denial. If, however, it is determined 1104 that the request is authentic, the process 1100 may include accessing 1108 one or more applicable policies. Accessing 1108 applicable policies may be performed by any suitable system or component thereof, such as by a policy management service described above. Applicable policies may be accessed, for example, by retrieving policy documents from a policy repository such as described above. In some embodiments, timing information indicating when policies become effective is used to select a subset of policies from a set of policies that are applicable (e.g., a set of policies that, without regards to the timing information, would apply to the request). The selected subset may comprise those policies that have timing information indicative of the policies in the subset currently being in effect.

A determination may then be made 1110 whether applicable policies allow fulfillment of the request. A determination 1110 whether policy allows fulfillment of the request may be performed by any suitable system such as by a policy engine 410 described above. A policy engine or other system determining whether policy allows fulfillment of the request may analyze applicable policies to determine whether the policy allows fulfillment of the request. As discussed, the manner in which the analysis takes place may vary in accordance with various embodiments. For example, applicable policies or, generally, potentially applicable policies may be analyzed in sequence. If a policy in a sequence of policy would be violated by fulfillment of a request, a determination may be made that policy does not allow fulfillment of the request without analyzing the remainder of the sequence (if any). More complex processing may also be performed. For example, if a statement in a policy document indicates that fulfillment of the request would violate policy encoded in the statement, a determination may be made whether any additional policies supersede that policy and allow fulfillment of the request. Generally, the policies may be analyzed in any suitable manner, and the manners may vary in accordance with which the various systems are configured and how policies are encoded. If it is determined 1110 that policy does not allow the request to be fulfilled, the process 1100 may include denying 1106 the request such as described above. If, however, it is determined 1110 that policy does allow fulfillment of the request, the request may be fulfilled 1112.

As with all processes discussed herein, variations are considered as being within the scope of the present disclosure. For example, the process 1100 and other processes described herein may include additional operations in addition to those illustrated and/or discussed herein. For example, in some instances, a system, such as a policy enforcement system may maintain (or have maintained by another system) an audit log of requests. An audit log may be made on a system-wide basis, on a customer-specific basis so that each customer of a service provider has a corresponding audit log or otherwise. The audit log may record requests that were received by a system (e.g., computing resource service) and store information associated with the requests, such as whether the requests were fulfilled, denied, unsuccessfully fulfilled and the like. Other information associated with a request stored in an audit log may include information identifying a submitter of the request (requestor), computing resources affected by the request, information about when the request was received and the like. In some embodiments, when requests are received, information is written to an audit log that identifies one or more services that caused the request to be submitted (e.g., a via set, as discussed in more detail below). For example, if the request was submitted by a first service as a result of having received a request from a second service, information may be written to the audit log that identifies the first and second service. Such information may indicate an order of causation of events that caused the request and/or may include other information.

Figure 12:
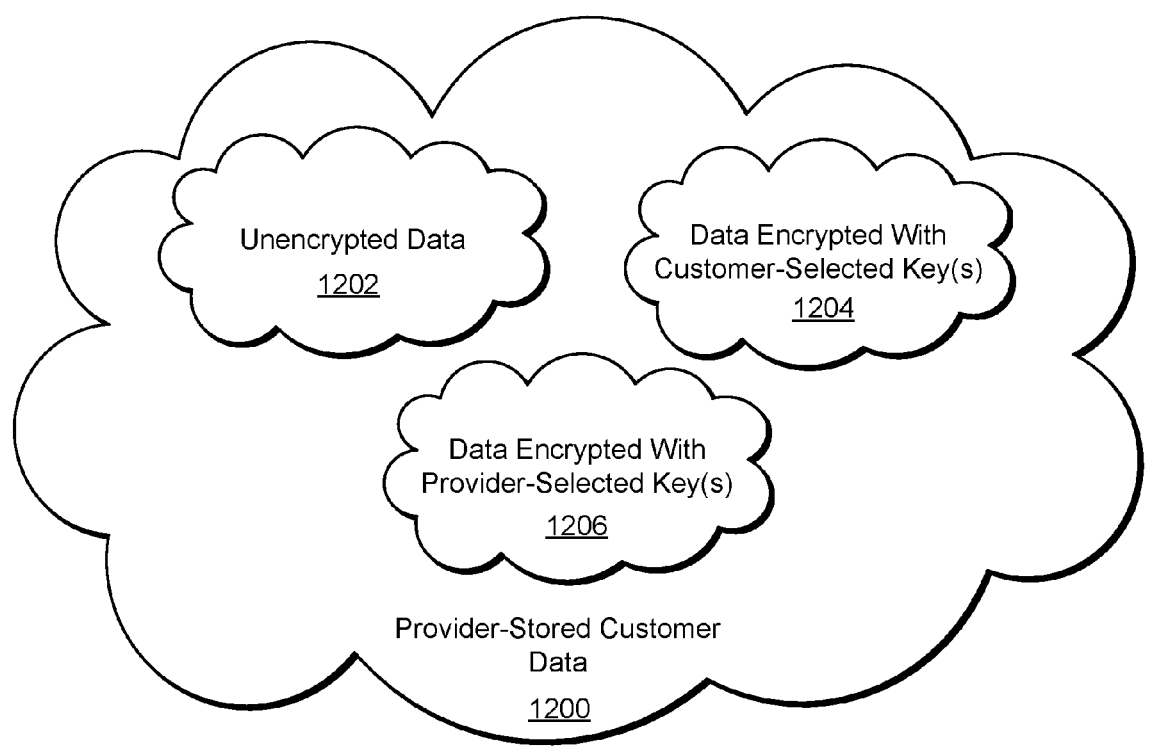
FIG. 12 shows an illustrative example of various types of data that may be stored by a service provider in accordance with at least one embodiment.

FIG. 12 shows an illustrative example of various data that may be stored by a service provider such as a computing resource service provider as described above. As illustrated in FIG. 12, a service provider may store various types of provider stored customer data 1200. The provider-stored customer data 1200 may include various types of data, such as unencrypted data 1202. Unencrypted data 1202 may be data that the service provider stores in plaintext form. A customer of the service provider may, for example, upload data without having indicated that the data should be encrypted. The data may be stored in an unencrypted form for various reasons such as for ease of access and because the data is of a nature where data security is not an issue.

The provider-stored customer data 1200 may also include data encrypted with customer-selected keys 1204. The data encrypted with customer-selected keys 1204 may be data that has been encrypted directly or indirectly utilizing a cryptography service such as described above. For example, customers may submit requests to the cryptography service and the cryptography service may encrypt data specified by the request using keys identified by key identifiers in the request. In some embodiments, the data encrypted by the cryptography service is itself cryptographic keys. For example, in some embodiments data is encrypted using and encryption key. The encryption key may be provided (e.g., by a customer or another service) to the cryptography service for encryption by the cryptography service using a key specified by the customer where specification of the key may be explicit (e.g. using a key identifier as a parameter in an API call) or implicit (e.g., by default). It should be noted, however, that data may be encrypted directly by the cryptography service without having encrypted the data using an intermediate encryption key.

The provider-stored customer data 1200 may also include data encrypted with provider-selected keys. Data encrypted with provider-selected keys may be data that is encrypted using a key outside of customer's control (i.e., a key that the customer is unable to explicitly select). For example, in some embodiments, requests to a data storage service may be submitted with an option for server-side encryption. In such requests, the customer specifies that the data should be encrypted and perhaps how the data should be encrypted (e.g., which encryption algorithm or mode of an encryption algorithm to use) but the requests do not specify which key to use for the encryption. The provider may select a key and encrypt the data accordingly. The data may be stored in a manner such that a key that was used to encrypt the data is obtainable so as to render the data decryptable when appropriate, such as in response to a valid data retrieval request. In some embodiments, for example, a data storage service receives a request to store data using server-side encryption. The data storage service may generate or otherwise obtain an encryption key, encrypt the data and transmit the encryption key in a request to a cryptography service. The cryptography service may use a default master key for the data storage service (or a key specified by the data storage service) to encrypt the encryption key. The encrypted encryption key may be stored with or otherwise in association with the encrypted data. Other variations where data of a customer are encrypted using a provider selected key are considered as being within the scope of the present disclosure.

Some or all of the types of provider-stored customer data 1200 may comprise resources (e.g., data objects) to which one or more policies may be applicable. For example, a policy may state conditions for access to certain data objects. Applicability of a policy to data may be defined based at least in part on data object identifiers, identifiers for logical data containers used to organize data objects, for keys used to encrypt data objects, and the like. Further, as discussed in more detail below, policies may be defined so as to apply to different principals in different ways. For instance, a policy may allow access to data dependent at least in part on which service(s) or services (if any) are involved in fulfilling a pending request (e.g., a pending customer request). As an illustrative example, a policy may apply differently if a request to which the policy is being evaluated was received from a customer or from another service.

Figure 13:
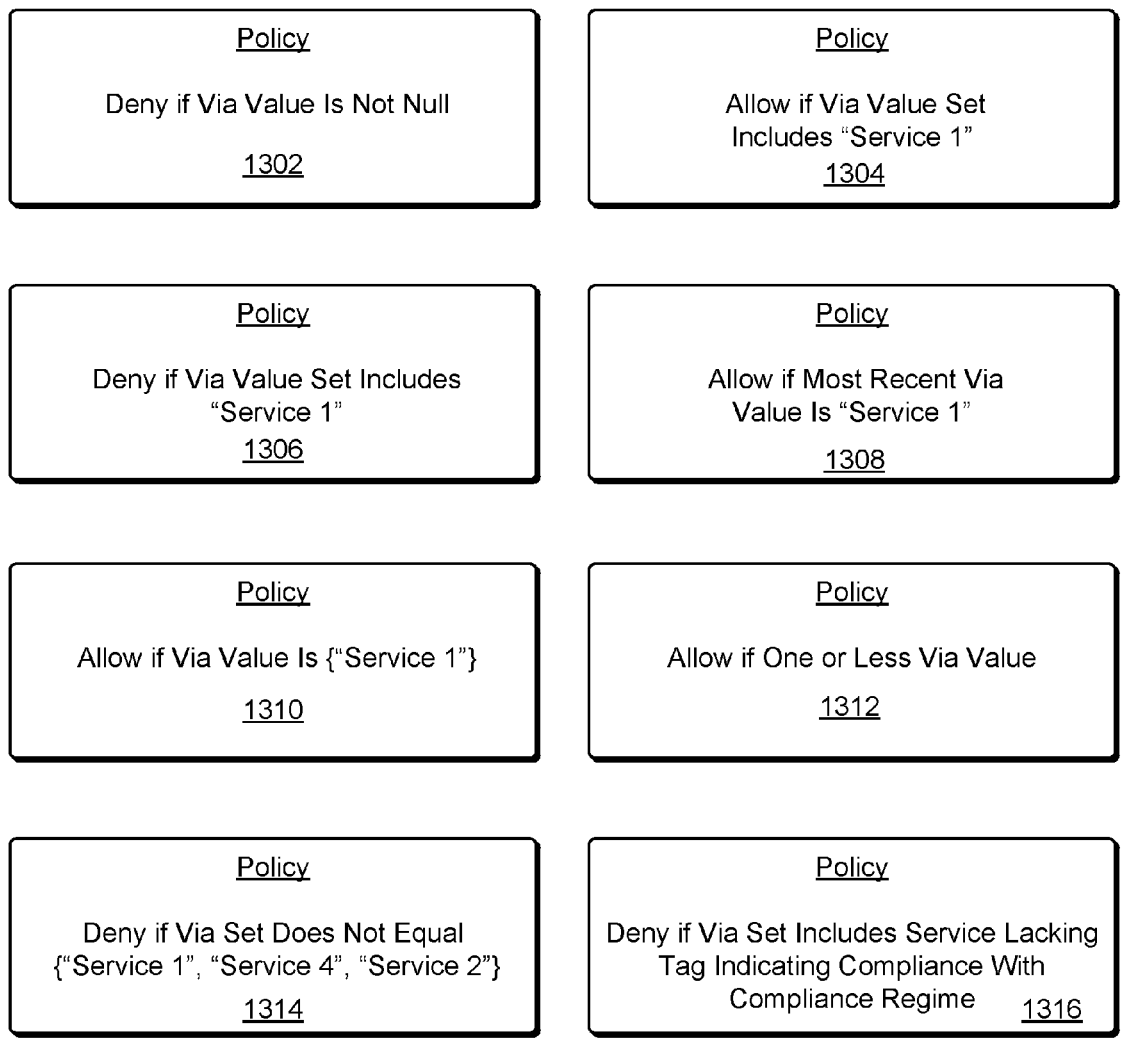
FIG. 13 shows illustrative examples of policies in accordance with various embodiments.

FIG. 13 shows illustrative examples of policies which may be used to control access to computing resources such as data in accordance with various embodiments. The policies illustrated in FIG. 13 may be implemented by a policy management system and/or policy evaluation engine such as described above. As with all policies the policies illustrated in FIG. 13 may apply to one or more principals where the principals may correspond to human operators (e.g., users of a customer) or systems (e.g., services of a service provider). In an embodiment, an application programming interface may allow customers of a computing resource service provider to configure policies such as those illustrated in FIG. 13 on cryptographic keys managed remotely by the customers using the resources of the computing resource service provider. Principals and/or resources to which policies apply may be defined by one or more characteristics of the resources. For example, a policy may apply to any users having an associated role in a system. As another example, a policy may apply to any data encrypted using a specified cryptographic key managed by a cryptography service.

Turning to the specific policies illustrated in FIG. 13, a first policy 1302 indicates that a request should be denied if a VIA value is not null. As discussed, the VIA value may be a value in a token provided with a request that indicates a service through which a request was routed and/or generally a service that performs one or more operations in connection fulfillment of a request. For example, if fulfillment of a customer request involves a request from a first service to a second service, a token provided from the first service to the second service may include an identifier of the first service as a VIA value to indicate to a policy evaluation engine the originator of the request. Similarly, if fulfillment of a customer request involves a first request from a first service to a second service and fulfillment of the first request involves a request transmitted from the second service to a third service, a token provided to the third service may include identifiers of the second service and third service as VIA values. The VIA values may be ordered to indicate or may otherwise indicate an order in which the requests were submitted. Thus, in the illustrative example of the policy 1302, a request to which the policy 1302 applies would be disallowed by the policy 1302 if the request was received from a service instead of from a user (although, in some embodiments, a policy that disallows or allows an action may be overridden by another applicable policy).

FIG. 13 also shows another policy 1304. In the example of the policy 1304, a request to which the policy 1304 would be allowed if a VIA value set includes Service 1 and would be denied otherwise (if not allowed by another applicable policy). A VIA value set may comprise a set of VIA values (e.g., zero or more VIA values) encoded in a token provided with a request. It should be noted that the policies illustrated in FIG. 13 may be evaluated in a context where default behavior (e.g., allow or deny) applies, either by default system behavior or by policy. Thus, a policy with "allow" may override a default policy of "deny" when applicable to a request. Similarly, a policy with "deny" may override a default policy of "allow" when applicable to a request. Returning to the example policy 1304, a request to which the policy 1304 applies would be allowable if fulfillment of the request involved submission of the request from a service identified as "Service 1" (and other applicable policy did not supersede the policy 1304).

FIG. 13 also shows another example of a policy 1306. In the example policy 1306, a request to which the policy 1306 applies would be denied if the VIA value set contains "Service 1." Thus, in contrast to the policy 1304, if fulfillment of a request involved a request submitted by a service identified as "Service 1," the request would be denied. Such as a policy may be set, for example, in instances where a user does not trust the service identified as Service 1 for one or more reasons, such as the service not having been audited and found to be compliant with one or more regulatory regimes desirable to the user.

As noted above, a token may indicate an ordering of multiple VIA values, where the ordering may correspond to an order in which requests were submitted. Accordingly, FIG. 13 shows another example, policy 1308 where fulfillment of a request is allowed if a most recent VIA value is "Service 1," that is, if the request for which the policy 1308 is being evaluated was transmitted by Service 1. If the request was submitted by another service, the request may be denied (e.g., unless another applicable policy renders fulfillment of the request allowable).

In an example policy 1310, a request to which the policy 1310 applies is allowable by the policy 1310 if the VIA value set is equal to a set having one member where that member is Service 1, that is, a service identified by "Service 1." In this manner, for a request to which the policy 1310 applies, if the request was triggered by another request to Service 1 by another service, fulfillment of the request would be contrary to the policy 1310 and, therefore, the request would be denied unless allowable for a reason independent of the policy 1310.

An example policy 1312 indicates that a request to which the policy 1312 applies is allowable if there is one or less VIA value. In this manner, for a request to which the policy 1312 applies, if fulfillment of a request requires two services, the VIA value set would not comply with the conditions in the policy 1312. As yet another example policy 1314, a request to which the policy 1314 applies would be contrary to the policy 1314 if the VIA value set does not equal {"Service 1," "Service 4," "Service 2"}. In this manner, fulfillment of request must involve a specific sequence of use of services identified respectively as "Service 1," "Service 4" and "Service 2."

For an example policy 1316, a request to which the policy 1316 applies would be contrary to the policy if the VIA set provided with the request includes a service lacking a tag indicating compliance with a compliance regime where the compliance regime may be specified in the policy. Example compliance regimes include, but are not limited to, the Health Insurance Portability and Accountability Act (HIPAA), International Traffic in Arms Regulations (ITAR), and the Payment Card Data Security Standards (PCI DSS). One or more compliance regimes may be encoded in the policy 1316 itself and/or the policy 1316 may contain a reference to one or more compliance regimes, such as a uniform resource locator (URL) or other reference to a list of one or more compliance regimes maintained outside of the policy 1316.

It should be noted that the policies illustrated in FIG. 13 are provided for illustrative purposes and other policies are considered as being within the scope of the present disclosure. For example, policies may be defined with more complex conditions than illustrated in FIG. 13. Conditions of a policy may, for instance, be defined using some conditions which are logically connected through, for example, Boolean operators. In addition, the example policies provides specific examples of policies with various conditions relating to originating systems for requests and events causing triggers of requests (e.g., other requests to other systems). In the example of the policy 1316, a policy is defined based at least in part on a characteristic of a service associated with a request to which the policy 1316 applies, where, in this example, the characteristic of the service is the existence of a tag associated with the service indicating compliance with a regulatory regime. Other characteristics of services, and generally characteristics of VIA value sets, may also be used to define policies in accordance with the various embodiments. Further, characteristics of services, VIA value sets and generally characteristics of items to which a policy may apply may be defined externally to policy, as illustrated in the example of a reference to a list of compliance regime(s). For such policies, evaluation of a policy may include accessing referenced information to determine whether fulfillment of a request complies with policy. Conditions of policies may be more complex and a policy may include, in addition to one or more conditions on a VIA value set, one or more conditions based at least in part on the presence of a pending customer request. For example, a policy may allow fulfillment of a request conditioned on the presence of a customer request, which may be verifiable by information provided in a response from an authentication service, such as described below. In this manner, services can be prevented from operating on behalf of a customer without explicit authorization to do so evidenced by a request (e.g., appropriately configured API call) from the customer.

It should be noted that the policies of FIG. 13, for the purpose of illustration, are shown without any particular syntax. Policies may be encoded in various ways, such as using a syntax suitable for a system that evaluates the policies where the syntax may vary in accordance with various embodiments. Example syntaxes are those used in policy languages discussed above.

As noted above, when an authentication request is submitted from a service or a user to an authentication service, the authentication service may provide a response that includes various information that provides various technical advantages such as efficient use of forward access sessions.

Figure 14:
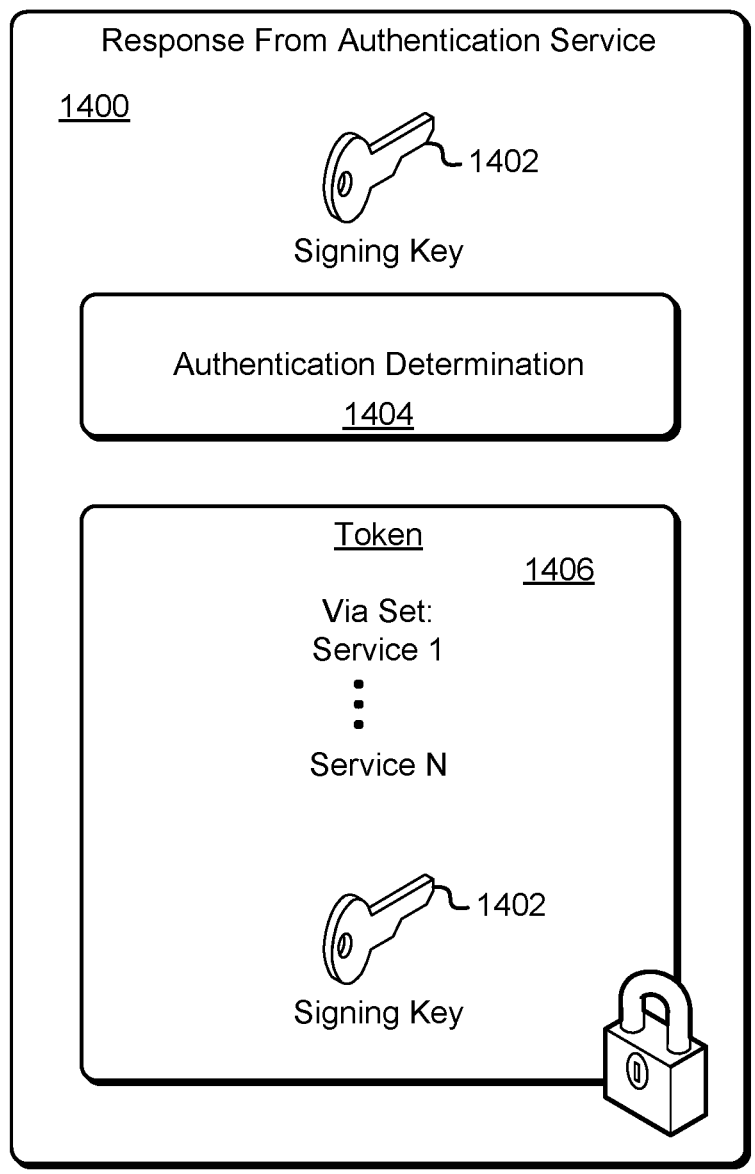
FIG. 14 shows an illustrative example of a response from an authentication service in accordance with at least one embodiment.

FIG. 14, accordingly, shows an illustrative example of a response 1400 from an authentication service. In an embodiment, the response 1400 includes a signing key 1402. The signing key 1402 may be a cryptographic key usable to generate an electronic signature of a request submitted to another service such that the other service is able to verify the electronic signature. Verification of the electronic signature may be performed in various ways in accordance with various embodiments. For example, in some embodiments, the electronic signature is verifiable by submitting, with an appropriate token as discussed below, the electronic signature and the data of the request on which the electronic signature was based to the authentication service or another service configured with an appropriate cryptographic key for verifying the request which may be the same as the signing key 1402. In some embodiments, information in a token (discussed below) enables a service that receives a request signed by the signing key 1402 is able to verify the request without communication with the authentication service, thereby reducing latency and reliance on another service.

As illustrated FIG. 14, a response from an authentication service may also include an authentication determination 1404. The authentication determination 1404 may include an indication of whether a request should be fulfilled, which may include an indirect indication by, for example, indicating whether an electronic signature is valid. It should be noted that the response from the authentication service may vary based, at least in part, on the authentication determination 1404. For example, a response from the authentication service may lack a signing key and/or token (discussed below) if the authentication determination is a negative one.

In an embodiment, the response 1400 also includes a token 1406 which may comprise information encrypted so as to be decryptable by a service to which the token will be submitted. In an embodiment, for example, the token is encrypted using a key held secretly by the authentication service so that the authentication service is able to decrypt the token when presented in a request. In another embodiment, the token is encrypted using a key shared secretly between the authentication service and another service. In this manner, when the token is presented in a request to the other service, the other service can use its copy of the cryptographic key to decrypt the token and use the information encoded therein. It should be noted that, while FIG. 14 shows a single token 1406, a response from an authentication service may include multiple tokens, each encrypted so as to be decryptable by a different service. In this manner, appropriate tokens may be selected and presented accordingly for submission of requests.

As illustrated in FIG. 14, the token 1406 includes various information usable by a recipient of the token to determine whether to fulfill a request. For example, the token 1406 may encode a VIA set, such as described above. In this manner, a system evaluating policy may use the VIA set to determine whether the VIA set complies with policy. It should be noted that the VIA set may be provided in plaintext form in the response 1400 and authenticity of the VIA set may be accomplished through, for instance, an electronic signature. In the illustrative example of FIG. 14, the token 1406 also includes the signing key 1402 (encrypted as a result of being in the token 1406). In this manner, the token can be decrypted by a recipient service to extract the signing key 1402 and use the extracted signing key 1402 to verify an electronic signature generated by another service using the signing key 1402.

As noted, the response 1400 illustrated in FIG. 14 is illustrative in nature and variations are considered as being within the scope of the present disclosure. For example, information additional to that which is illustrated in the figure may be provided in the response 1400. Such information may include, for instance, an expiration for the token 1406, an attestation to the existence of a pending customer request, an attestation to the identity from whom the request was submitted, an attestation to the identity of a customer on behalf of whom the request was submitted and/or generally any information which may be required to satisfy one or more conditions for fulfillment of another request submitted using information from the response 1400.

Figure 15:
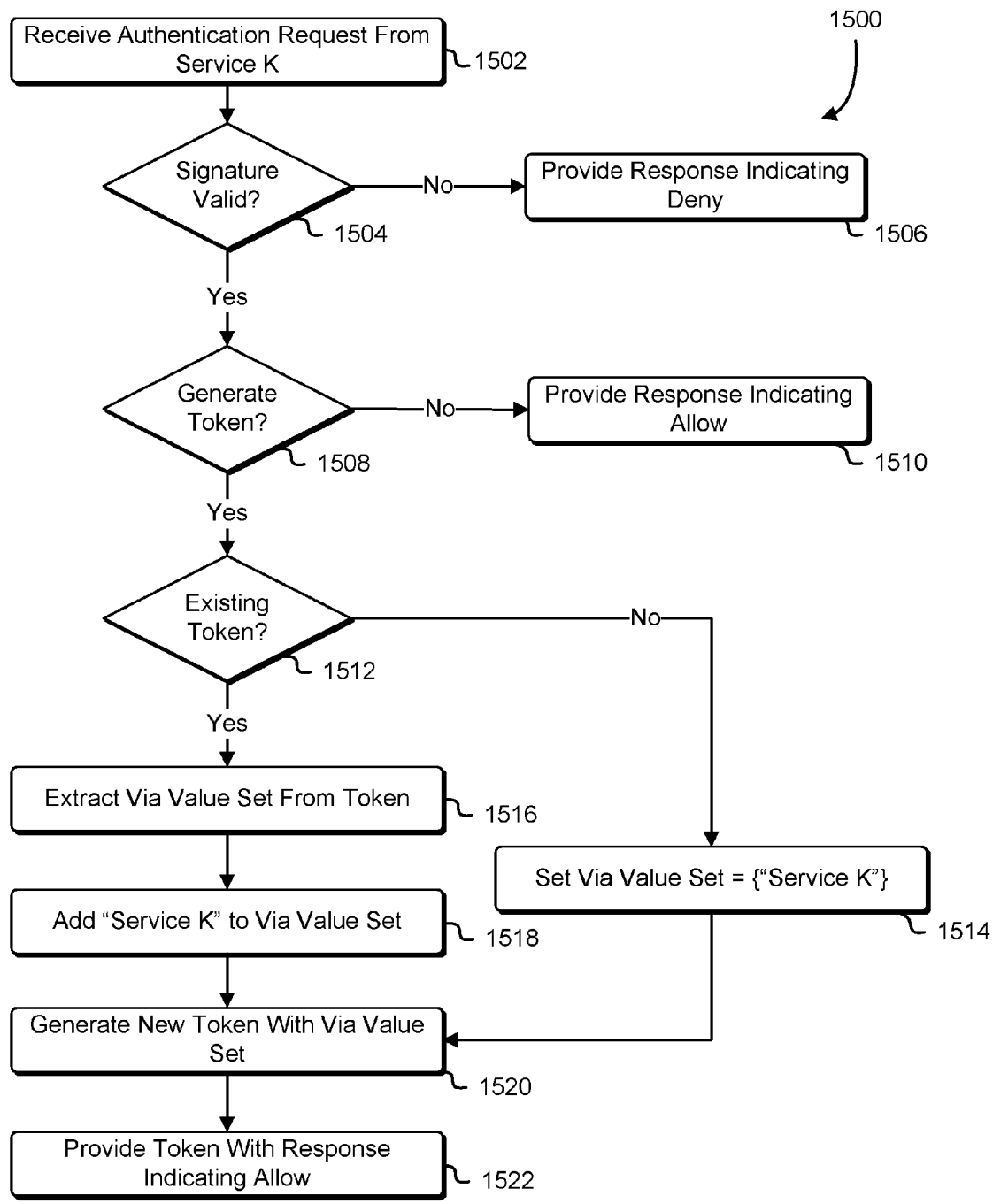
FIG. 15 shows an illustrative example of a process for evaluating an authentication request in accordance with at least one embodiment.

FIG. 15 shows an illustrative example of a process 1500 for evaluating an authentication request in accordance with an embodiment. The process 1500 may be performed by any suitable system, such by an authentication service described above. The process 1500 may also be performed by other systems, such as by a local system in a service that caches information and uses the cached information to evaluate requests. In an embodiment, the process 1500 includes receiving 1502 an authentication request from a service, which in FIG. 15 is illustratively labeled as Service K. The request may, for example, be received over a network of a computing resource service provider and/or one or more other networks. Upon receipt of the request, the process 1500 may include determining 1504 whether a signature of the request is valid, such as described above. If it is determined 1504 that the electronic signature is not valid, the process 1500 may include providing 1506 a response indicating DENY. For example, referring to FIG. 14, a response form the authentication service may include an authentication determination 1404 indicative that a request being verified should be denied. If it is determined 1504 that the signature is valid, the process 1500 may include determining 1508 whether to generate a token such as described above in connection with FIG. 14.

Determining 1508 whether to generate the token may be performed in various ways in accordance with various embodiments. For example, determining 1508 whether to generate a token may include detecting that the request originated from a particular service instead of from a user such as described above. As a result of the request being received from a service, it may be determined 1508 to generate a token. Determining 1508 whether to generate a token may also be based at least in part on other factors, such as whether an authentication request indicated a request for a token (due to the need to submit a token in a request to another service.) It should be noted that, in some embodiments, tokens are generated for all requests for which it is determined 1504 that a signature is valid.

Returning to the illustrative embodiment of FIG. 15, if it is determined 1508 that a token not be generated, the process 1500 may include providing 1510 a response that indicates ALLOW. If, however, it is determined 1508 that a token should be generated, the process 1500 may include determining 1512 whether there is an existing token. Determining 1512 whether there's an existing token may include, for instance, determining whether the received 1502 authentication request was submitted with a token. If it is determined 1512 that there is no existing token, the process 1500 may include setting 1514 a VIA value set to be {"Service K"}. If, however, it is determined 1512 that there is an existing token, a VIA value set may be extracted 1516 from the existing token and Service K may be added to the VIA value set. Once the VIA value set has been determined, the process 1500 may include generating 1520 a new token with the VIA value set. The generated token may then be provided 1522 with a response that indicates ALLOW. The response may be configured, for example, such as described above in connection with FIG. 14.

A token received with a response such as generated in accordance with FIG. 15 may be used, as noted, to submit a request to another service. The other service may use the token (and possibly other information in the request) to evaluate whether to fulfill the request, such as by evaluating policy based at least in part on information in a VIA value set (or lack thereof), such as described above.

Figure 16:
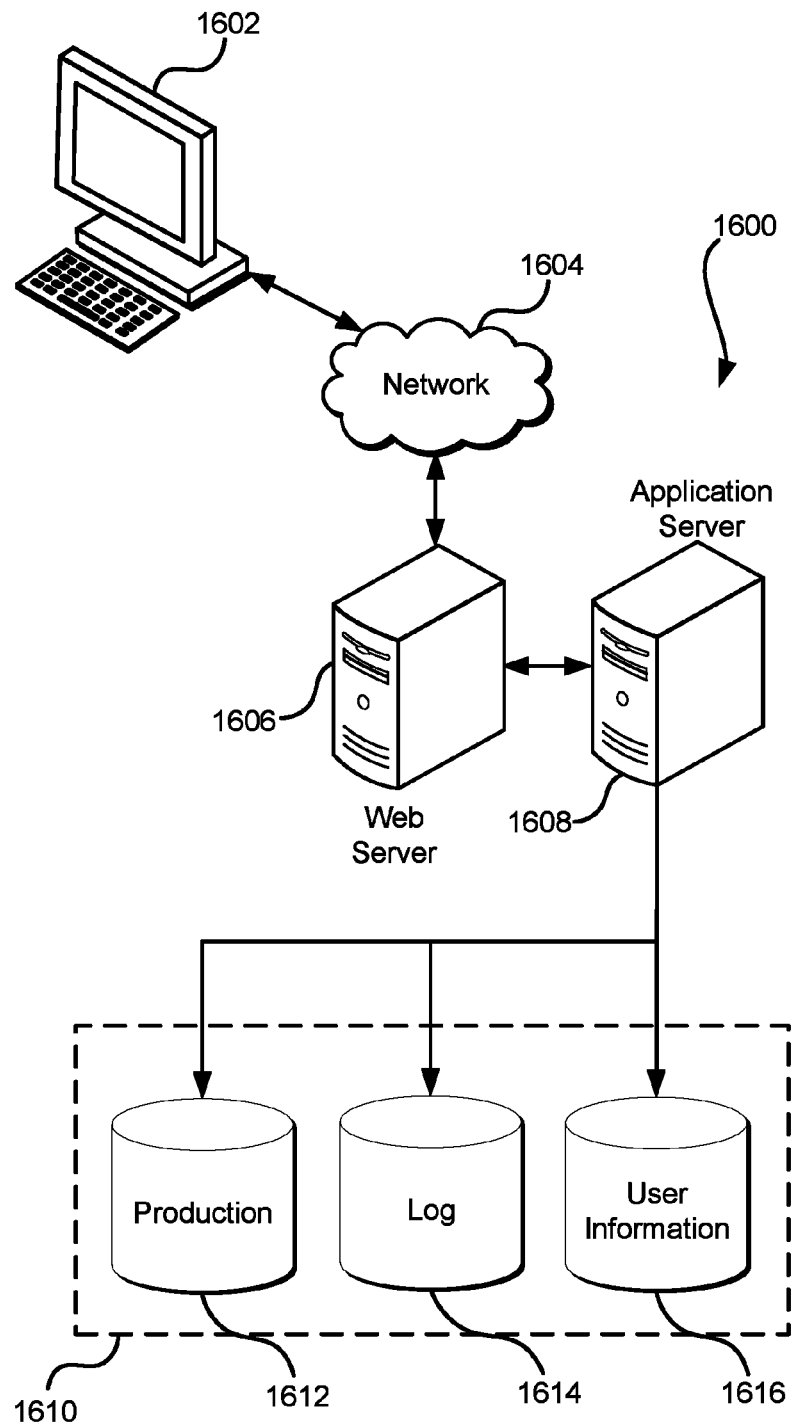
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML"), or another appropriate structured language in this example. The handling of all requests and responses, as well as the delivery of content between the client device 1602 and the application server 1608, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1610 can include several separate data tables, databases or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
memory to store instructions that, if executed by one or more processors of the system, cause the system to:
send a first request and an authentication response associated with the first request, the authentication response including information identifying a set of computing resource devices to be accessed;
utilize the authentication response, based at least in part on fulfilling the first request, to send a second request;
process the second request according to a policy determination, the policy determination is determined by at least evaluating a set of policies applicable to the second request based at least in part on the first request and the authentication response; and
send a third request, the third request being processed according to a policy of the policy determination, processing the policy is based at least in part on a user profile associated with the authentication response that triggered the third request, including the first request and the second request.

2. The system of claim 1, wherein:
process the second request includes use of a first cryptographic key specified in the second request to perform one or more cryptographic operations;
process the third request includes use of a second cryptographic key specified in the third request to perform one or more cryptographic operations; and
the set of policies specify one or more conditions required to be satisfied before the first and second cryptographic keys are usable.

3. The system of claim 1, wherein:
the first request is sent on behalf of a customer of a computing resource service provider of a first, second, and third computing resource devices; and
the set of policies include policy determination that is different than the policy determination would be if the first request was received from an entity that is not the customer.

4. The system of claim 3, wherein the first, second, and third computing resource devices further implement an application programming interface through which application programming interface requests are sent, by a customer of a computing resource service provider of the first, second, and third computing resource devices, to define one or more conditions for processing requests sent by the first, second, and third computing resource devices on behalf of the customer.

5. The system of claim 3, wherein the second computing resource device comprises an application programming interface through which customers of a computing resource service provider of the first, second, and third computing resource devices are able to send requests to be processed by the first, second, and third computing resource devices.

6. A computer-implemented method, comprising:
sending a first request and an authentication response associated with the first request, the authentication response including information identifying a set of computing resource services to be accessed;
utilizing the authentication response, based at least in part on fulfilling the first request, to send a second request;
processing the second request according to a policy determination, the policy determination is determined by at least evaluating a set of policies applicable to the second request based at least in part on the first request and the authentication response; and
sending a third request, the third request being processed according to a policy of the policy determination, processing the policy is based at least in part on a user profile associated with the authentication response that triggered the third request, including the first request and the second request.

7. The computer-implemented method of claim 6, wherein:
the first, second, and third requests include a cryptographic key; and
processing the first, second, and third requests involves performance of one or more cryptographic operations using the cryptographic key.

8. The computer-implemented method of claim 7, wherein the first, second, and third requests include an identifier of the cryptographic key.

9. The computer-implemented method of claim 6, wherein processing the first, second, and third requests is based at least in part on the policy that comprises:
determining, based at least in part on information provided with the first, second, and third requests, one or more services that each sent a corresponding request thereby becoming a cause of the first, second, and third requests; and
determining, based at least in part on the determined one or more services, that the processing of the first, second, and third requests is in compliance with the policy.

10. The computer-implemented method of claim 9, wherein the authentication response associated provided with the first request is encoded in a token generated by an authentication service.

11. The computer-implemented method of claim 6, wherein:
the first request is triggered by a customer request sent to a first service, the customer request corresponding to a service provider account.

12. The computer-implemented method of claim 11, wherein the policy requires the first request to be sent from a user associated with the service provider account, and if not, the first request will be denied.

13. The computer-implemented method of claim 6, further comprising, as a result of sending the first, second, and third requests, writing a set of one or more intermediate services that causes the first, second, and third requests to be identified to an audit log in association with the first, second, and third requests.

14. The computer-implemented method of claim 11, wherein:
the set of policies include policy determination is different than the policy determination would be if the first request was received from a user of the service provider account compared to if the first request was not received from a user of the service provider account.

15. The computer-implemented method of claim 6, wherein:
the policy specifies a cryptographic key; and
processing the first, second, and third requests based at least in part on the policy being performed as a result of using the cryptographic key required for processing the first, second, and third requests.

16. The computer-implemented method of claim 6, wherein:
- the policy specifies a tag value; and
- processing the first, second, and third requests based at least in part on the policy being performed as a result of the first, second, and third requests being applicable to a set of computing resources associated with the tag value.

17. A non-transitory computer-readable storage medium having stored thereon instructions that, if executed by one or more processors of a computer system, cause the computer system to:
- send a first request and an authentication response associated with the first request, the authentication response including information identifying a set of computing resource devices to be accessed;
- utilize the authentication response, based at least in part on fulfilling the first request, to send a second request;
- process the second request according to a policy determination, the policy determination is determined by at least evaluating a set of policies applicable to the second request based at least in part on the first request and the authentication response; and
- send a third request, the third request being processed according to a policy of the policy determination, processing the policy is based at least in part on a user profile associated with the authentication response that triggered the third request, including the first request and the second request.

18. The non-transitory computer-readable storage medium of claim 17, wherein the instructions that, if executed by one or more processors of a computer system, further cause the computer system to analyze a first and second token, generated by an authentication service, provided with the second and third requests.

19. The non-transitory computer-readable storage medium of claim 17, wherein the second request accesses, in plaintext form, data persistently stored in encrypted form.

20. The non-transitory computer-readable storage medium of claim 19, wherein the set of policies applicable to the second request includes at least one policy determinable based at least in part on the data persistently stored in encrypted form.

* * * * *